United States Patent
Washio

(10) Patent No.: US 10,746,295 B2
(45) Date of Patent: Aug. 18, 2020

(54) CONTROL APPARATUS FOR VEHICLE DRIVE-FORCE TRANSMITTING APPARATUS

(71) Applicant: TOYOTA JIDOSHA KABUSHIKI KAISHA, Toyota-shi, Aichi-ken (JP)

(72) Inventor: Taichi Washio, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 98 days.

(21) Appl. No.: 16/233,717

(22) Filed: Dec. 27, 2018

(65) Prior Publication Data

US 2019/0195361 A1   Jun. 27, 2019

(30) Foreign Application Priority Data

Dec. 27, 2017   (JP) ................. 2017-252416

(51) Int. Cl.
*F16H 61/662*   (2006.01)
*F16H 61/66*   (2006.01)
*F16H 37/02*   (2006.01)

(52) U.S. Cl.
CPC ..... *F16H 61/66272* (2013.01); *F16H 37/022* (2013.01); *F16H 2061/6601* (2013.01); *F16H 2061/6618* (2013.01); *F16H 2061/6629* (2013.01); *F16H 2061/66277* (2013.01)

(58) Field of Classification Search
CPC ..... F16H 61/66272; F16H 2061/66277; F16H 2061/6601; F16H 2061/6618; F16H 2061/6629

See application file for complete search history.

(56) References Cited

U.S. PATENT DOCUMENTS

| | | | |
|---|---|---|---|
| 8,527,167 B2* | 9/2013 | Yamanaka | B60W 10/06 701/51 |
| 9,133,930 B2* | 9/2015 | Takahashi | F16H 61/66272 |
| 9,695,766 B2* | 7/2017 | Matsuo | F16H 61/04 |
| 9,810,321 B2* | 11/2017 | Nakamura | B60W 30/20 |
| 9,829,093 B2* | 11/2017 | Nitani | F16H 61/04 |
| 9,970,522 B2* | 5/2018 | Fujita | F16H 59/44 |
| 10,001,179 B2* | 6/2018 | Kimura | F16D 48/066 |

(Continued)

FOREIGN PATENT DOCUMENTS

| | | |
|---|---|---|
| JP | 5403164 B2 | 1/2014 |
| JP | 2015105708 A | 6/2015 |

*Primary Examiner* — David R Morris
(74) *Attorney, Agent, or Firm* — Oliff PLC

(57) ABSTRACT

A control apparatus for a drive-force transmitting apparatus that includes a gear mechanism and a continuously-variable transmission mechanism including primary and secondary pulleys and actuators that apply first and second thrusts to the respective first and second pulleys. When a target gear ratio of the continuously-variable transmission mechanism is a highest gear ratio in a gear running mode, the control apparatus sets a value of the thrust ratio, which is used when calculating a target value of a secondary thrust, to a value that increases a difference between a lower limit value of the primary thrust and the target value of the secondary thrust, and sets a value of the thrust ratio, which is used when calculating a target value of the primary thrust, to a value that increases a difference between the target value of the secondary thrust and the target value of the primary thrust.

10 Claims, 10 Drawing Sheets

(56) References Cited

U.S. PATENT DOCUMENTS

| | | | |
|---|---|---|---|
| 10,047,859 B2* | 8/2018 | Hattori | F16H 37/0846 |
| 10,066,746 B2* | 9/2018 | Fukao | F16H 61/66272 |
| 10,174,834 B2* | 1/2019 | Inoue | F16H 9/18 |
| 10,196,061 B2* | 2/2019 | Kimura | B60W 30/20 |
| 10,323,745 B2* | 6/2019 | Inoue | F16H 37/022 |
| 10,443,713 B2* | 10/2019 | Washio | F16H 61/662 |
| 10,571,021 B2* | 2/2020 | Aoyama | B60K 17/3515 |
| 10,591,056 B2* | 3/2020 | Washio | F16H 61/66272 |
| 2010/0318270 A1* | 12/2010 | Yamanaka | B60W 30/186 |
| | | | 701/58 |
| 2013/0165282 A1 | 6/2013 | Hattori et al. | |
| 2015/0081181 A1* | 3/2015 | Takahashi | F16H 61/6624 |
| | | | 701/51 |
| 2016/0334010 A1* | 11/2016 | Nitani | B60K 17/165 |
| 2016/0368499 A1* | 12/2016 | Kimura | B60K 17/02 |
| 2016/0369856 A1* | 12/2016 | Kimura | F16D 48/066 |
| 2017/0037965 A1* | 2/2017 | Inoue | F16H 37/022 |
| 2017/0037966 A1* | 2/2017 | Nakamura | F16H 57/0006 |
| 2017/0051691 A1* | 2/2017 | Matsuo | F02D 41/221 |
| 2017/0114895 A1* | 4/2017 | Hattori | F16H 37/022 |
| 2017/0159814 A1* | 6/2017 | Fukao | F16H 37/0846 |
| 2017/0211672 A1* | 7/2017 | Fujita | F16H 59/44 |
| 2017/0254412 A1* | 9/2017 | Inoue | F16H 9/18 |
| 2018/0180174 A1* | 6/2018 | Washio | F16H 37/022 |
| 2018/0180180 A1* | 6/2018 | Moritomo | F16H 37/022 |
| 2018/0335134 A1* | 11/2018 | Ohgata | F16H 61/12 |
| 2019/0061767 A1* | 2/2019 | Terada | F16H 37/0846 |
| 2019/0128415 A1* | 5/2019 | Washio | F16H 61/66272 |
| 2019/0145515 A1* | 5/2019 | Aoyama | F16H 9/18 |
| | | | 192/3.63 |
| 2019/0195358 A1* | 6/2019 | Hattori | F16H 61/66272 |
| 2019/0195359 A1* | 6/2019 | Hattori | F16H 61/66272 |
| 2019/0195360 A1* | 6/2019 | Washio | F16H 61/66272 |
| 2019/0234515 A1* | 8/2019 | Washio | F16H 9/18 |
| 2019/0241172 A1* | 8/2019 | Washio | F16H 9/04 |
| 2019/0242475 A1* | 8/2019 | Washio | F16H 61/0206 |
| 2019/0249756 A1* | 8/2019 | Washio | F16H 3/728 |
| 2019/0270381 A1* | 9/2019 | Washio | B60K 17/06 |
| 2019/0316674 A1* | 10/2019 | Hattori | F16H 37/0846 |

* cited by examiner

CONTROL APPARATUS FOR VEHICLE DRIVE-FORCE TRANSMITTING APPARATUS

This application claims priority from Japanese Patent Application No. 2017-252416 filed on Dec. 27, 2017, the disclosure of which is herein incorporated by reference in its entirety.

FIELD OF THE INVENTION

The present invention relates to a control apparatus for a drive-force transmitting apparatus that is to be provided in a vehicle, wherein the drive-force transmitting apparatus has a plurality of drive-force transmitting paths that are provided in parallel with each other between a drive force source and drive wheels of the vehicle.

BACKGROUND OF THE INVENTION

There is known a control apparatus for a vehicle drive-force transmitting apparatus defining a drive-force transmitting path through which a drive force is to be transmitted by a continuously-variable transmission mechanism including a primary pulley, a secondary pulley, and a transfer element in the form of a belt or a chain that is looped over the primary and secondary pulleys. JP-5403164B2 discloses such a control apparatus for a vehicle drive-force transmitting apparatus. In the disclosed control apparatus, a primary-side slip limit thrust that is minimally required by the primary pulley to prevent slippage of the transfer element on the primary pulley and a secondary-side slip limit thrust that is minimally required by the secondary pulley to prevent slippage of the transfer element on the secondary pulley are calculated, and a secondary-side shifting-control thrust that is required by the secondary pulley is calculated based on the primary-side slip limit thrust and a thrust ratio (=thrust applied to secondary pulley/thrust applied to primary pulley) that corresponds to a target gear ratio of the continuously-variable transmission mechanism. Then, a larger one of the secondary-side shifting-control thrust and the secondary-side slip limit thrust is selected as a secondary target thrust that is to be applied to the secondary pulley, and a primary target thrust is calculated based on the secondary target thrust and the thrust ratio that corresponds to the target gear ratio.

Further, there is also known a vehicle drive-force transmitting apparatus, as a vehicle driving apparatus disclosed in JP-2015-105708A, which defines drive-force transmitting paths provided in parallel with each other between an input rotary member (to which the drive force is to be transmitted from the drive force source) and an output rotary member (from which the drive force is to be outputted toward the drive wheels), wherein the drive-force transmitting paths include (i) a first drive-force transmitting path which is to be established by engagement of a first engagement device and through which the drive force is to be transmitted by a gear mechanism that provides a gear ratio and (ii) a second drive-force transmitting path which is to be established by engagement of a second engagement device and through which the drive force is to be transmitted by a the continuously-variable transmission mechanism.

SUMMARY OF THE INVENTION

By the way, in the drive-force transmitting apparatus defining the first and second drive-force transmitting paths which are parallel with each other and through which the drive force is to be transmitted by the gear mechanism and the continuously-variable transmission mechanism, respectively, it is preferable to appropriately control the gear ratio of the continuously-variable transmission mechanism, for example, even during running of the vehicle with the second engagement device being completely released such as running with the first drive-force transmitting path being established. Where the gear ratio of the continuously-variable transmission mechanism is to be kept at the highest gear ratio during the running with the second engagement device being completely released, it might be possible to facilitate the highest gear ratio to be kept, for example, by setting the primary target thrust (that is calculated based on the secondary target thrust) to a value lower than a value that corresponds to the highest gear ratio to establish the highest gear ratio. Each of the pulleys of the continuously-variable transmission mechanism is rotated even during the running with the second engagement device being completely released, so that a centrifugal hydraulic pressure is generated in each pulley by rotation of the pulley, so as to cause a centrifugal thrust to act on each pulley. Thus, a structural limit minimum thrust, which contains the centrifugal thrust, structurally acts on each pulley. Since the centrifugal thrust tends to be increase with increase of rotational speed of the pulley, the primary target thrust could be smaller than the structural limit minimum thrust acting on the primary pulley during the running with the second engagement device being completely released. In this case, even if a command based on the primary target thrust is outputted, the thrust applied to the primary pulley is caused to be the structural limit minimum thrust (acting on the primary pulley) that is larger than the primary target thrust, so that the gear ratio of the continuously-variable transmission mechanism could not be kept at the highest gear ratio. It is noted that the term "gear ratio" is defined as "rotational speed of input-side rotary member/rotational speed of output-side rotary member". For example, the gear ratio of the above-described drive-force transmitting apparatus is defined as "rotational speed of the input rotary member/rotational speed of the output rotary member", and the gear ratio of the above-described continuously-variable transmission is defined as "rotational speed of the primary pulley/rotational speed of the secondary pulley". A vehicle running speed could be lower as the gear ratio is higher, and could be higher as the gear ratio is lower. The above-described highest gear ratio of the continuously-variable transmission mechanism can be expressed also as a lowest-speed gear ratio.

The present invention was made in view of the background art described above. It is therefore an object of the present invention to provide a control apparatus for a vehicle drive-force transmitting apparatus, which is capable of keeping a gear ratio of the continuously-variable transmission mechanism at a highest gear ratio, where a target gear ratio of the continuously-variable transmission mechanism is the highest gear ratio during vehicle running with the second engagement device being completely released.

The object indicated above is achieved according to the following aspects of the present invention.

According to a first aspect of the invention, there is provided a control apparatus for a drive-force transmitting apparatus that is to be provided in a vehicle having a drive force source and drive wheels. The drive-force transmitting apparatus includes: an input rotary member to which a drive force is to be transmitted from the drive force source; an output rotary member from which the drive force is to be outputted to the drive wheels; a gear mechanism configured to provide at least one gear ratio; a continuously-variable transmission mechanism including a primary pulley, a secondary pulley, and a transfer element that is looped over the primary and secondary pulleys, such that the primary pulley includes a primary hydraulic actuator configured to apply a primary thrust, based on which the transfer element is to be clamped by the primary pulley, and such that the secondary pulley includes a secondary hydraulic actuator configured to apply a secondary thrust, based on which the transfer element is to be clamped by the secondary pulley; and first and second engagement devices. The drive-force transmitting apparatus defines a plurality of drive-force transmitting paths that are provided in parallel with each other between the input rotary member and the output rotary member such that the drive force is to be transmitted from the input rotary member to the output rotary member through the drive-force transmitting paths. The plurality of drive-force transmitting paths includes a first drive-force transmitting path that is to be established by engagement of the first engagement device, such that the drive force is to be transmitted by the gear mechanism through the first drive-force transmitting path when the first drive-force transmitting path is established by the engagement of the first engagement device. The plurality of drive-force transmitting paths include a second drive-force transmitting path that is to be established by engagement of the second engagement device, such that the drive force is to be transmitted by the continuously-variable transmission mechanism through the second drive-force transmitting path when the second drive-force transmitting path is established by the engagement of the second engagement device. The control apparatus comprises a transmission shifting control portion configured to calculate, based on an input torque inputted to the continuously-variable transmission mechanism, a thrust ratio which is a ratio of the secondary thrust to the primary thrust and which corresponds to a target gear ratio of the continuously-variable transmission mechanism. When the target gear ratio is a highest gear ratio of the continuously-variable transmission mechanism during running of the vehicle with the second engagement device being completely released, the transmission shifting control portion is configured to set a first value of the thrust ratio, which is used when calculating a target value of the secondary thrust based on a lower limit value of the primary thrust that is not smaller than a centrifugal thrust acting on the primary pulley, and to set a second value of the thrust ratio, which is used when calculating a target value of the primary thrust based on the target value of the secondary thrust, such that the first value of the thrust ratio is set to a first-difference increasing value that causes a first difference between the lower limit value of the primary thrust and the target value of the secondary thrust to be larger, than a value that corresponds to the highest gear ratio as the target gear ratio, and such that the second value of the thrust ratio is set to a second-difference increasing value that causes a second difference between the target value of the secondary thrust and the target value of the primary thrust to be larger, than a value that corresponds to the highest gear ratio as the target gear ratio.

According to a second aspect of the invention, in the control apparatus according to the first aspect of the invention, when the target gear ratio is not the highest gear ratio of the continuously-variable transmission mechanism during the running of the vehicle with the second engagement device being completely released, the transmission shifting control portion is configured to set the first value of the thrust ratio to the first-difference increasing value, and to set the second value of the thrust ratio to the value that corresponds to the target gear ratio. The control apparatus may further comprises a state determining portion that is configured, during running of the vehicle, to determine whether the second engagement device is completely released or not and whether the target gear ratio is the highest gear ratio or not, wherein, when the state determining portion determines that the second engagement device is completely released and that the target gear ratio is the highest gear ratio, the transmission shifting control portion is configured to set the first value of the thrust ratio to the first-difference increasing value, and to set the second value of the thrust ratio to the second-difference increasing value, and wherein, when the state determining portion determines that the second engagement device is completely released and that the target gear ratio is not the highest gear ratio, the transmission shifting control portion is configured to set the first value of the thrust ratio to the first-difference increasing value, and to set the second value of the thrust ratio to the value that corresponds to the target gear ratio.

According to a third aspect of the invention, in the control apparatus according to the first or second aspect of the invention, the second engagement device is a wet-type frictional engagement device, wherein the transmission shifting control portion is configured, during the running of the vehicle with the second engagement device being completely released, to handle a drag torque of the second engagement device as the input torque inputted to the continuously-variable transmission mechanism, and wherein each of the first-difference increasing value and the second-difference increasing value includes an added value in addition to the value that corresponds to the highest gear ratio as the target gear ratio, wherein the added value is determined based on variation of the drag torque of the second engagement device.

According to a fourth aspect of the invention, in the control apparatus according to any one of the first through third aspects of the invention, the running of the vehicle with the second engagement device being completely released corresponds to running of the vehicle with the first drive-force transmitting path being established, wherein the transmission shifting control portion is configured to set the target gear ratio to the highest gear ratio, during the running of the vehicle with the first drive-force transmitting path being established.

According to a fifth aspect of the invention, in the control apparatus according to any one of the second through fourth aspects of the invention, the running of the vehicle with the second engagement device being completely released corresponds to running of the vehicle in a neutral state of the drive-force transmitting apparatus in which the first engagement device as well as the second engagement device is released, wherein the transmission shifting control portion is configured, during the running of the vehicle in the neutral state at a running speed that is in a relatively high range, to set the target gear ratio to a value that is dependent on the running speed, and is configured, during the running of the vehicle in the neutral state at a running speed that is in a relatively low range, to set the target gear ratio to the highest gear ratio.

According to a sixth aspect of the invention, in the control apparatus according to any one of the first through fifth aspects of the invention, the transmission shifting control portion is configured to select, as the lower limit value of the primary thrust, a larger one of (i) a slip limit thrust which is minimally required to prevent slippage of the transfer element on the primary pulley and (ii) a structural limit minimum thrust which contains the centrifugal thrust acting on the primary pulley and which acts on the primary pulley.

According to a seventh aspect of the invention, in the control apparatus according to the sixth aspect of the invention, the transmission shifting control portion is configured to select, as a lower limit value of the secondary thrust, a larger one of (iii) a slip limit thrust which is minimally required to prevent slippage of the transfer element on the secondary pulley and (iv) a structural limit minimum thrust which contains a centrifugal thrust acting on the secondary pulley and which physically acts on the secondary pulley, wherein the transmission shifting control portion is configured to select, as the target value of the secondary thrust, a larger one of (v) the lower limit value of the secondary thrust and (vi) a value of the secondary thrust which is calculated based on the lower limit value of the primary thrust.

According to an eighth aspect of the invention, in the control apparatus according to the sixth or seventh aspect of the invention, wherein the transmission shifting control portion is configured to calculate the slip limit thrust based on a gear ratio of the continuously-variable transmission mechanism and the input torque inputted to the continuously-variable transmission mechanism.

According to a ninth aspect of the invention, in the control apparatus according to any one of the first through eighth aspects of the invention, the continuously-variable transmission mechanism, by which the drive force is to be transmitted through the second drive-force transmitting path, provides a continuously-variable gear ratio that is lower than at least one of the at least one gear ratio provided by the gear mechanism by which the drive force is to be transmitted through the first drive-force transmitting path.

In the control apparatus according to the first aspect of the invention, where the target gear ratio of the continuously-variable transmission mechanism (that provides a continuously-variable gear ratio that is variable within a given range) is the highest gear ratio (that corresponds to a maximum value within the given range of the continuously-variable gear ratio) during running of the vehicle with the second engagement device being completely released, the above-described first value of the thrust ratio, which is used for calculating the target value of the secondary thrust based on the lower limit value of the primary thrust that is not smaller than the centrifugal thrust acting on the primary pulley, is set to the first-difference increasing value that causes the first difference of the lower limit value of the primary thrust and the target value of the secondary thrust to be larger, than the value that corresponds to or establishes the highest gear ratio as the target gear ratio, and the above-described second value of the thrust ratio, which is used when for calculating the target value of the primary thrust based on the target value of the secondary thrust, is set to the second-difference increasing value that causes the second difference of the target value of the secondary thrust and the target value of the primary thrust to be larger, than the value that corresponds to or establishes the highest gear ratio as the target gear ratio. Thus, the target value of the primary thrust is made not smaller than the lower limit value of the primary thrust, while being made smaller than a thrust value by which the gear ratio of the continuously-variable transmission mechanism is kept at the highest gear ratio. That is, the thrust ratio, which corresponds to a higher gear ratio higher than the highest gear ratio, is obtained, and the target value of the secondary thrust, which makes it possible to obtain the target value of the primary thrust that is not smaller than the lower limit value of the primary thrust, is calculated. Therefore, where the target gear ratio of the continuously-variable transmission mechanism is the highest gear ratio during the running with the second engagement device being completely released, it is possible to keep the gear ratio of the continuously-variable transmission mechanism at the highest gear ratio.

In the control apparatus according to the second aspect of the invention, where the target gear ratio of the continuously-variable transmission mechanism is not the highest gear ratio during the running of the vehicle with the second engagement device being completely released, the above-described first value of the thrust ratio is set to the first-difference increasing value that causes the first difference of the lower limit value of the primary thrust and the target value of the secondary thrust to be larger, than the value that corresponds to or establishes the highest gear ratio as the target gear ratio, and the above-described second value of the thrust ratio is set to the value that corresponds to or establishes the target gear ratio. Thus, the thrust ratio, which corresponds to or establishes the target gear ratio, is obtained, and the target value of the secondary thrust, which makes it possible to obtain the target value of the primary thrust that is not smaller than the lower limit value of the primary thrust, is calculated. Further, it is possible to avoid an actual value of the gear ratio of the continuously-variable transmission mechanism from being deviated from the target gear ratio toward a higher value.

In the control apparatus according to the third aspect of the invention, during the running of the vehicle with the wet-type frictional engagement device as the second engagement device being completely released, the drag torque of the second engagement device is handled as the input torque inputted to the continuously-variable transmission mechanism, and each of the above-described first-difference increasing value and second-difference increasing value contains the added value in addition to the value that corresponds to or establishes the highest gear ratio as the target gear ratio, wherein the added value is determined based on variation of the drag torque of the second engagement device. Thus, the target value of the secondary thrust, which makes it possible to obtain the target value of the primary thrust that is not smaller than the lower limit value of the primary thrust, is appropriately calculated. Further, each of the first-difference increasing value and second-difference increasing value can be appropriately set.

In the control apparatus according to the fourth aspect of the invention, the running of the vehicle with the second engagement device being completely released corresponds to running of the vehicle with the first drive-force transmitting path being established, and the target gear ratio is set to the highest gear ratio during the running of the vehicle with the first drive-force transmitting path being established. Thus, it is possible to keep the gear ratio of the continuously-variable transmission mechanism at the highest gear ratio during the running with the first drive-force transmitting path being established.

In the control apparatus according to the fifth aspect of the invention, the running of the vehicle with the second engagement device being completely released corresponds to running of the vehicle in a neutral state of the drive-force transmitting apparatus in which the first engagement device as well as the second engagement device is released, and the target gear ratio is set to a value that is dependent on the running speed during the running in the neutral state with the running speed being in a relatively high range, and is set to the highest gear ratio during the running in the neutral state with the running speed being in a relatively low range. Thus, during the running in the neutral state at the running speed that is in the relatively low range, the gear ratio of the continuously-variable transmission mechanism can be kept at the highest gear ratio. Further, during the running in the neutral state at the running speed that is in the relatively high range, an actual value of the gear ratio of the continuously-variable transmission mechanism can be avoided from being deviated from the target gear ratio toward a higher value.

In the control apparatus according to the sixth aspect of the invention, a larger one of (i) the slip limit thrust which is minimally required to prevent slippage of the transfer element on the primary pulley and (ii) the structural limit minimum thrust which contains the centrifugal thrust acting on the primary pulley and which physically acts on the primary pulley, is selected as the lower limit value of the primary thrust. Thus, the target value of the secondary thrust, which prevents slippage of the transfer element on the primary pulley and which provides the target value of the primary thrust that is not smaller than the structural limit minimum thrust, is calculated.

In the control apparatus according to the seventh aspect of the invention, a larger one of (iii) the slip limit thrust which is minimally required to prevent slippage of the transfer element on the secondary pulley and (iv) the structural limit minimum thrust which contains the centrifugal thrust acting on the secondary pulley and which physically acts on the secondary pulley, is selected as the lower limit value of the secondary thrust, and then a larger one of (v) the lower limit value of the secondary thrust and (vi) a value of the secondary thrust that is calculated based on the lower limit value of the primary thrust, is selected as the target value of the secondary thrust. Thus, the target value of the secondary thrust, which prevents slippage of the transfer element on the primary pulley and on the secondary pulley and which provides the target value of the primary thrust that is not smaller than the structural limit minimum thrust, is calculated.

In the control apparatus according to the eighth aspect of the invention, the slip limit thrust, which is minimally required to prevent slippage of the transfer element on each of the primary and secondary pulleys, is calculated based on a gear ratio (i.e., the target gear ratio or an actual value of the gear ratio) of the continuously-variable transmission mechanism and the input torque inputted to the continuously-variable transmission mechanism. Thus, the target value of the primary thrust, which prevents slippage of the transfer element on the primary pulley, is appropriately calculated. Further, where the feature of this eighth aspect of the invention is combined with the feature of the seventh aspect of the invention, the target value of the secondary thrust, which prevents slippage of the transfer element on the secondary pulley, is appropriately calculated.

In the control apparatus according to the ninth aspect of the invention, the continuously-variable transmission mechanism, by which the drive force is to be transmitted through the second drive-force transmitting path, provides a continuously-variable gear ratio that is lower than at least one of the at least one gear ratio provided by the gear mechanism by which the drive force is to be transmitted through the first drive-force transmitting path. Thus, when the continuously-variable gear ratio of the continuously-variable transmission mechanism is the highest gear ratio, the gear ratio established in the second drive-force transmitting path becomes the closest to the gear ratio established in the first drive-force transmitting path.

DETAILED DESCRIPTION OF PREFERRED EMBODIMENT

In the embodiment of the present invention, each of the primary pulley (i.e., input-side pulley) and the secondary pulley (i.e., output-side pulley) includes, for example, a fixed sheave, a movable sheave and a hydraulic actuator, which is configured to apply a thrust for changing a width of an annular groove defined between the fixed and movable sheaves of a corresponding one of the primary and secondary pulleys. A vehicle provided with the above-described drive-force transmitting apparatus includes a hydraulic control unit configured to control pulley hydraulic pressures supplied as working hydraulic pressures to the respective hydraulic actuators, independently of each other. The hydraulic control unit may be configured to control an amount of flow of a working fluid supplied to each of the hydraulic actuators so as to consequently generate the pulley hydraulic pressures, for example. A shifting control operation is performed by the hydraulic control unit to execute a shifting action to establish a target gear ratio while preventing slippage of a transfer element in the continuously-variable transmission mechanism, by controlling the thrust (=pulley hydraulic pressure * pressure receiving area) applied to each of the primary and secondary pulleys. The transfer element, which is looped over the primary and secondary pulleys, may be a compression-type endless annular transmission belt including at least one endless annular hoop and a multiplicity of thick-plate-shaped block elements that are held by the at least one endless annular hoop so as to be arranged in their thickness direction corresponding to a circumferential direction of the transmission belt, along the at least one endless annular hoop, or alternatively, a tension-type belt constituting an endless annular link chain including a plurality of link plates alternately superposed and mutually connected at their end portions through connecting pins. The above-described continuously variable transmission mechanism is a known belt-type continuously-variable transmission, and can be broadly interpreted to conceptually encompass not only the belt-type continuously-variable transmission but also a chain-type continuously-variable transmission.

The above-described drive force source is, for example, an internal combustion engine such as a gasoline engine and a diesel engine generating a drive force by combustion of fuel supplied thereto. The vehicle may be equipped with, in addition to or in place of a drive force source in the form of the engine, another drive force source in the form of, for example, an electric motor.

Hereinafter, a preferred embodiment of the invention will be described in detail with reference to the accompanying drawings.

Embodiment

Figure 1:
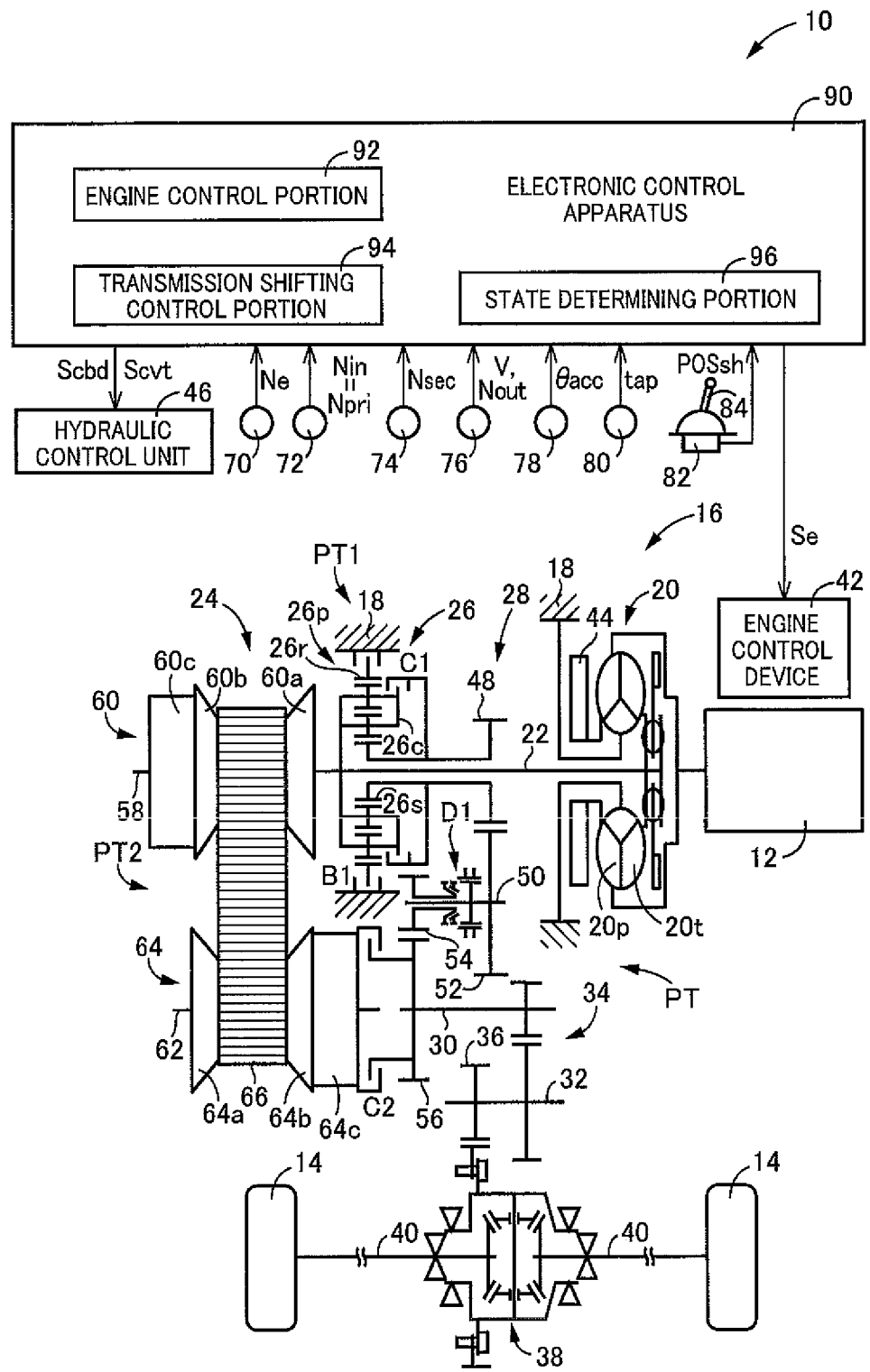
FIG. 1 is a schematic view showing a construction of a vehicle to be controlled by a control apparatus according to the present invention, and major control functions and control portions of the control apparatus.

FIG. 1 is a schematic view showing a construction of a vehicle 10 to be controlled by a control apparatus according to the present invention, and major control functions and control portions of the control apparatus. As shown in FIG. 1, the vehicle 10 is provided with an engine 12 functioning as a drive force source configured to generate a drive force, drive wheels 14 and a drive-force transmitting apparatus 16 that is provided in drive-force transmitting paths between the engine 12 and the drive wheels 14.

The drive-force transmitting apparatus 16 includes a non-rotary member in the form of a casing 18, a fluid-operated type drive-force transmitting device in the form of a known torque converter 20 that is connected to the engine 12, an input shaft 22 connected to the torque converter 20, a continuously-variable transmission mechanism 24 connected to the input shaft 22, a forward/reverse switching device 26 connected to the input shaft 22, a gear mechanism 28 which is provided in parallel with the continuously-variable transmission mechanism 24 and which is connected to the input shaft 22 via the forward/reverse switching device 26, an output shaft 30 serving as an output rotary member that is common to the continuously-variable transmission mechanism 24 and the gear mechanism 28, a counter shaft 32, a reduction gear device 34 consisting of a pair of mutually meshing gears each of which is connected to a corresponding one of the output shaft 30 and the counter shaft 32 so as to be unrotatable relative to the corresponding one of the shafts 30, 32, a gear 36 connected to the counter shaft 32 so as to be unrotatable relative to the counter shaft 32, and a differential gear device 38 connected to the gear 36. The torque converter 20, input shaft 22, continuously-variable transmission mechanism 24, forward/reverse switching device 26, gear mechanism 28, output shaft 30, counter shaft 32, reduction gear device 34, gear 36 and differential gear device 38 are disposed within the casing 18. The drive-force transmitting apparatus 16 further includes right and left axles 40 that are connected to the differential gear device 38. The input shaft 22 serves as an input rotary member to which the drive force of the engine 12 is to be inputted. The output shaft 30 serves as the output rotary member through which the drive force of the engine 12 is to be outputted. It is noted that the above-described drive force is synonymous with a drive torque or a drive power unless otherwise distinguished from them.

In the drive-force transmitting apparatus 16 constructed as described above, the drive force generated by the engine 12 is transmitted to the right and left drive wheels 14, via the torque converter 20, forward/reverse switching device 26, gear mechanism 28, reduction gear device 34, differential gear device 38, axles 40 and other elements, or alternatively, via the torque converter 20, continuously-variable transmission mechanism 24, reduction gear device 34, differential gear device 38, axles 40 and other elements.

As described above, the drive-force transmitting apparatus 16 has the gear mechanism 28 and the continuously-variable transmission mechanism 24 that are provided in parallel with each other in respective drive-force transmitting paths PT between the engine 12 and the drive wheels 14. Specifically, the drive-force transmitting apparatus 16 has the gear mechanism 28 and the continuously-variable transmission mechanism 24 that are provided in parallel with each other in the respective drive-force transmitting paths PT between the input shaft 22 and the output shaft 30. That is, the drive-force transmitting apparatus 16 defines the plurality of drive-force transmitting paths that are parallel with each other between the input shaft 22 and the output shaft 30, such that the drive force of the engine 12 is to be transmitted from the input shaft 22 to the output shaft 30 through a selected one of the drive-force transmitting paths PT. The plurality of drive-force transmitting paths PT consist of a first drive-force transmitting path PT1 constituted mainly by the gear mechanism 28 and a second drive-force transmitting path PT2 constituted mainly by the continuously-variable transmission mechanism 24. The first and second drive-force transmitting paths PT1, PT2 are defined in parallel with each other between the input shaft 22 and the output shaft 30. The first drive-force transmitting path PT1 is a path through which the drive force of the engine 12 is to be transmitted from the input shaft 22 toward the drive wheels 14 through the gear mechanism 28. The second drive-force transmitting path PT2 is a path through which the drive force of the engine 12 is to be transmitted from the input shaft 22 toward the drive wheels 14 through the continuously-variable transmission mechanism 24.

In the drive-force transmitting apparatus 16, the drive force of the engine 12 is transmitted toward the drive wheels 14 through a selected one of the first and second drive-force transmitting paths PT1, PT2, which is selected depending on a running state of the vehicle 10. To this end, the drive-force transmitting apparatus 16 includes a plurality of engagement devices by which the selected one of the first and second drive-force transmitting paths PT1, PT2 is established. The plurality of engagement devices include a first clutch C1, a first brake B1 and a second clutch C2.

The first clutch C1, which serves as a first engagement device, is provided in the first drive-force transmitting path PT1 and configured to selectively connect and disconnect the first drive-force transmitting path PT1, such that the first drive-force transmitting path PT1 is established with engagement of the first clutch C1 during forward running of the vehicle 10. The first brake B1, which serves as an engagement device, is provided in the first drive-force transmitting path PT1 and configured to selectively connect and disconnect the first drive-force transmitting path PT1, such that the first drive-force transmitting path PT1 is established with engagement of the first brake B1 during reverse running of the vehicle 10. That is, the first drive-force transmitting path PT1 is established with either the first clutch C1 or the first brake B1 being engaged. The second clutch C2, which serves as a second engagement device, is disposed in the second drive-force transmitting path PT2 and configured to selectively connect and disconnect the second drive-force transmitting path PT2, such that the second drive-force transmitting path PT2 is established with engagement of the second clutch C2. That is, the second drive-force transmitting path PT2 is established with the second clutch C2 being engaged. Each of the first clutch C1, first brake B1 and second clutch C2 is a known hydraulically-operated wet-type frictional engagement device that is to be frictionally engaged by operation of a hydraulic actuator. As described below, each of the first clutch C1 and the first brake B1 constitutes a part of the forward/reverse switching device 26.

The engine 12 is provided with an engine control device 42 including an electronic throttle device, a fuel injection device, an ignition device and other devices that are required for controlling an output of the engine 12. In the engine 12, the engine control device 42 is controlled, by an electronic control apparatus 90 (that corresponds to a control apparatus recited in the appended claims), based on an operation amount θacc of an accelerator pedal that corresponds to a required drive force of the vehicle 10 required by an operator of the vehicle 10, whereby an engine torque Te of the engine 12 is controlled.

The torque converter 20 is provided with a pump impeller 20p and a turbine impeller 20t that are connected to the engine 12 and the input shaft 22, respectively. The drive-force transmitting apparatus 16 is provided with a mechanical oil pump 44 connected to the pump impeller 20p. The oil pump 44 is to be driven by the engine 12, to supply a working fluid pressure as its original pressure to a hydraulic control unit (hydraulic control circuit) 46 provided in the vehicle 10, for performing a shifting control operation in the continuously-variable transmission mechanism 24, generating a belt clamping force in the continuously-variable transmission mechanism 24, and switching an operation state of each of the above-described engagement devices between its engaged state and released state.

The forward/reverse switching device 26 includes a planetary gear device 26p of double-pinion type in addition to the first clutch C1 and the first brake B1. The planetary gear device 26p is a differential mechanism including three rotary elements consisting of an input element in the form of a carrier 26c, an output element in the form of a sun gear 26s and a reaction element in the form of a ring gear 26r. The carrier 26c is connected to the input shaft 22. The ring gear 26r is operatively connected to the casing 18 through the first brake B1. The sun gear 26s is connected to a small-diameter gear 48 that is provided to be coaxial with the input shaft 22 and rotatable relative to the input shaft 22. The carrier 26c and the sun gear 26s are operatively connected to each other through the first clutch C1.

The gear mechanism 28 includes, in addition to the above-described small-diameter gear 48, a gear-mechanism counter shaft 50 and a large-diameter gear 52 which meshes with the small-diameter gear 48 and which is provided to be coaxial with the gear-mechanism counter shaft 50 and unrotatable relative to the gear-mechanism counter shaft 50. The large-diameter gear 52 has a diameter larger than that of the small-diameter gear 48. The gear mechanism 28 further includes an idler gear 54 that is provided to be coaxial with the gear-mechanism counter shaft 50 and rotatable relative to the gear-mechanism counter shaft 50, and an output gear 56 that is provided to be coaxial with the output shaft 30 and unrotatable relative to the output shaft 30. The output gear 56 has a diameter larger than that of the idler gear 54. Therefore, the gear mechanism 28 provides a gear ratio between the input shaft 22 and the output shaft 30 in the first drive-force transmitting path PT1. That is, the gear mechanism 28 corresponds to a gear mechanism configured to provide at least one gear ratio. The gear mechanism 28 further includes a dog clutch D1 as an engagement device that is disposed on the gear-mechanism counter shaft 50 between the large-diameter gear 52 and the idler gear 54 so as to selectively connect and disconnect a drive-force transmitting path between the two gears 52, 54. The dog clutch D1 is configured to selectively connect and disconnect the first drive-force transmitting path PT1, such that the first drive-force transmitting path PT1 is established with engagement of the dog clutch D1. The dog clutch D1, which is also included in the above-described plurality of engagement devices, serves as an engagement device that cooperates with the first clutch C1 or the first brake B1 to establish the first drive-force transmitting path PT1. That is, the first drive-force transmitting path PT1 is established with both of the dog clutch D1 and the first clutch C1 or both of the dog clutch D1 and the first brake B1 being engaged. An operation state of the dog clutch D1 is switched by operation of a hydraulic actuator (not shown) that is included in the drive-force transmitting apparatus 16.

The first drive-force transmitting path PT1 is established with both of the dog clutch D1 and the first engagement device being engaged, namely, with both of engagement of the dog clutch D1 and engagement of either one of the first clutch C1 and the first brake B1 which cooperate with each other to constitute the first engagement device and which are located to be closer to the input shaft 22 than the dog clutch D1. When the first clutch C1 as well as the dog clutch D1 is engaged, the first drive-force transmitting path PT1 for forward running of the vehicle 10 is established. When the first brake B1 as well as the dog clutch D1 is engaged, the first drive-force transmitting path PT1 for reverse running of the vehicle 10 is established. In the drive-force transmitting apparatus 16, with the first drive-force transmitting path PT1 being established, the drive-force transmitting apparatus 16 is placed in its drive-force transmittable state in which the drive force of the engine 12 is transmittable from the input shaft 22 to the output shaft 30 through the gear mechanism 28. With the first drive-force transmitting path PT1 being cut off by release of both of the first clutch C1 and the first brake B1 or by release of the dog clutch D1, the drive-force transmitting apparatus 16 is placed in its neutral state in which the drive force is not transmittable.

Figure 2:
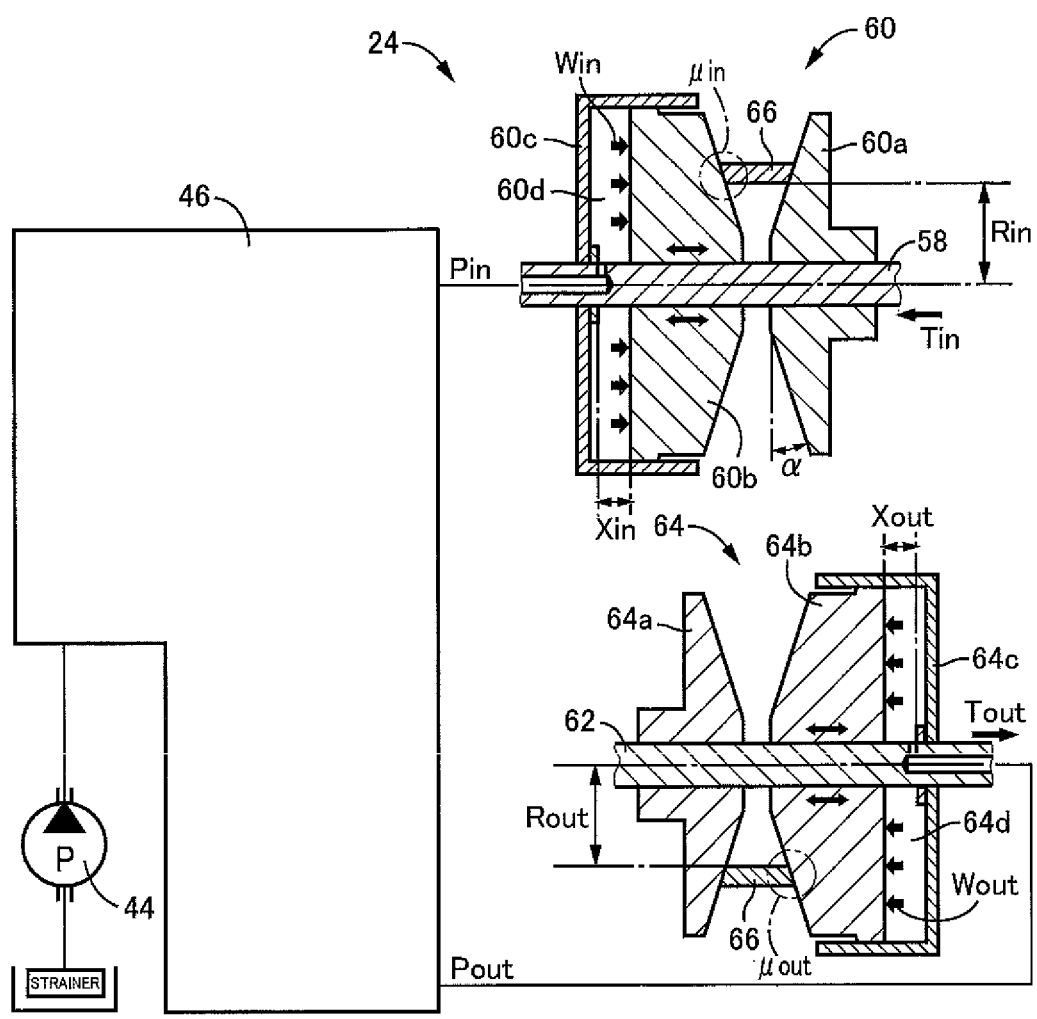
FIG. 2 is a view for explaining a construction of a continuously-variable transmission mechanism.

FIG. 2 is a view for explaining a construction of the continuously-variable transmission mechanism 24. As shown in FIGS. 1 and 2, the continuously-variable transmission mechanism 24 includes a primary shaft 58 provided to be coaxial with the input shaft 22 and connected integrally to the input shaft 22, a primary pulley 60 connected to the primary shaft 58 and having a variable effective diameter, a secondary shaft 62 provided to be coaxial with the output shaft 30, a secondary pulley 64 connected to the secondary shaft 62 and having a variable effective diameter, and a transfer element in the form of a transmission belt 66 looped over or mounted on the pulleys 60, 64. The continuously-variable transmission mechanism 24 is a known belt-type continuously-variable transmission in which the drive force is transmitted owing to a friction force generated between the transmission belt 66 and each of the pulleys 60, 64, and is configured to transmit the drive force of the engine 12 toward the drive wheels 14. The friction force is synonymous with a clamping force, and is referred also to as a belt clamping force. The belt clamping force corresponds to a belt torque capacity Tcvt that is a torque capacity of the transmission belt 66 in the continuously-variable transmission mechanism 24.

The primary pulley 60 includes a fixed sheave 60a connected to the primary shaft 58, a movable sheave 60b unrotatable about an axis of the primary shaft 58 and axially movable relative to the fixed sheave 60a, and a hydraulic actuator 60c configured to apply a primary thrust Win to the movable sheave 60b. The primary thrust Win is a thrust (=primary pressure Pin * pressure receiving area) for changing a width of a V-shaped groove defined between the fixed and movable sheaves 60a, 60b of the primary pulley 60. That is, the primary thrust Win is a thrust applied to the primary pulley 60 from the hydraulic actuator 60c, to clamp the transmission belt 66 that is mounted on the primary pulley 60. The primary pressure Pin is a hydraulic pressure supplied from the hydraulic control unit 46 to the hydraulic actuator 60c, and serves as a pulley hydraulic pressure for generating the primary thrust Win. Meanwhile, the secondary pulley 64 includes a fixed sheave 64a connected to the secondary shaft 62, a movable sheave 64b unrotatable about an axis of the secondary shaft 62 and axially movable relative to the fixed sheave 64a, and a secondary hydraulic actuator 64c configured to apply a secondary thrust Wout to the movable sheave 64b. The secondary thrust Wout is a thrust (=secondary pressure Pout * pressure receiving area) for changing a width of a V-shaped groove defined between the fixed and movable sheaves 64a, 64b of the secondary pulley 64. That is, the secondary thrust Wout is a thrust applied to the secondary pulley 64 from the secondary hydraulic actuator 64c, to clamp the transmission belt 66 that is mounted on the secondary pulley 64. The secondary pressure Pout is a hydraulic pressure supplied from the hydraulic control unit 46 to the secondary hydraulic actuator 64c, and serves as a pulley hydraulic pressure for generating the secondary thrust Wout.

In the continuously-variable transmission mechanism 24, the primary and secondary pressures Pin, Pout are controlled by the hydraulic control unit 46 that is controlled by the electronic control apparatus 90, whereby the primary and secondary thrusts Win, Wout are respectively controlled. With the primary and secondary thrusts Win, Wout being controlled, the widths of the V-shaped grooves of the respective pulleys 60, 64 are controlled to be changeable whereby a belt winding dimeter (effective diameter) of each of the pulleys 60, 64 is changeable and accordingly a gear ratio γcvt (=primary rotational speed Npri/secondary rotational speed Nsec) of the continuously-variable transmission mechanism 24 is changeable. Further, with the primary and secondary thrusts Win, Wout being controlled, the belt clamping force is controlled such that slipping of the transmission belt 66 is not caused. That is, with the primary and secondary thrusts Win, Wout being controlled, the gear ratio γcvt of the continuously-variable transmission mechanism 24 is controlled to a target gear ratio γcvttgt while the transmission belt 66 is prevented from being slipped. It is noted that the primary rotational speed Npri represents a rotational speed of the primary shaft 58 and that the secondary rotational speed Nsec represents a rotational speed of the secondary shaft 62.

In the continuously-variable transmission mechanism 24, when the primary pressure Pin is increased, the width of the V-shaped groove of the primary pulley 60 is reduced whereby the gear ratio γcvt is reduced. The reduction of the gear ratio γcvt corresponds to a shift-up action performed in the continuously-variable transmission mechanism 24. In the continuously-variable transmission mechanism 24, the lowest gear ratio γmin is provided with the width of the V-shaped groove of the primary pulley 60 being minimized. Within a range of the gear ratio γcvt that can be provided by the continuously-variable transmission mechanism 24, the lowest gear ratio gear ratio γmin is a value of the gear ratio γcvt which makes it possible to maximize the running speed of the vehicle 10. Further, in the continuously-variable transmission mechanism 24, when the primary pressure Pin is reduced, the width of the V-shaped groove of the primary pulley 60 is increased whereby the gear ratio γcvt is increased. The increase of the gear ratio γcvt corresponds to a shift-down action performed in the continuously-variable transmission mechanism 24. In the continuously-variable transmission mechanism 24, the highest gear ratio γmax is provided with the width of the V-shaped groove of the primary pulley 60 being maximized. Within the range of the gear ratio γcvt that can be provided by the continuously-variable transmission mechanism 24, the highest gear ratio gear ratio γmax is a value of the gear ratio γcvt which makes it possible to minimize the running speed of the vehicle 10. In the continuously-variable transmission mechanism 24, the belt slippage is prevented by the primary thrust Win and the secondary thrust Wout, and the target gear ratio γcvttgt is established by a combination of the primary thrust Win and the secondary thrust Wout, rather than by only one of the primary thrust Win and the secondary thrust Wout. As described below, the gear ratio γcvt of the continuously-variable transmission mechanism 24 is changed with change of a thrust ratio τ (=Wout/Win) which is a ratio of the secondary thrust Wout to the primary thrust Win and which is dependent on a relationship between the primary pressure Pin and the secondary pressure Pout. For example, the gear ratio γcvt is increased with increase of the thrust ratio τ, namely, a shift-down action of the continuously-variable transmission mechanism 24 is caused with increase of the thrust ratio τ.

The output shaft 30 is provided to be coaxial with the secondary shaft 62 and rotatable relative to the secondary shaft 62. The second clutch C2 is provided in a drive-force transmitting path (that corresponds to a part of the above-described second drive-force transmitting path PT2) between the secondary pulley 64 and the output shaft 30. The second drive-force transmitting path PT2 is established with engagement of the second clutch C2. In the drive-force transmitting apparatus 16, with the second drive-force transmitting path PT2 being established, the drive-force transmitting apparatus 16 is placed in its drive-force transmittable state in which the drive force of the engine 12 is transmittable from the input shaft 22 to the output shaft 30 through the continuously-variable transmission mechanism 24. With the second drive-force transmitting path PT2 being cut off by release of the second clutch C2, the drive-force transmitting apparatus 16 is placed in its neutral state in which the drive force is not transmittable. The gear ratio γcvt of the continuously-variable transmission mechanism 24 corresponds to a gear ratio established in the second drive-force transmitting path PT2.

In the drive-force transmitting apparatus 16, a gear ratio EL of the gear mechanism 28, which is a gear ratio γgear (=input-shaft rotational speed Nin/output-shaft rotational speed Nout) provided in the first drive-force transmitting path PT1, is higher than the above-described highest gear ratio γmax of the continuously-variable transmission mechanism 24 which is the highest gear ratio provided in the second drive-force transmitting path PT2. That is, the gear ratio EL is a value that makes it possible to reduce the running speed of the vehicle 10 more than the highest gear ratio γmax. The gear ratio EL of the gear mechanism 28 corresponds to a first-speed gear ratio γ1 in the drive-force transmitting apparatus 16. The highest gear ratio γmax of the continuously-variable transmission mechanism 24 corresponds to a second-speed gear ratio γ2 in the drive-force transmitting apparatus 16. Thus, any gear ratio provided in the second drive-force transmitting path PT2 is lower than the gear ratio provided in the first drive-force transmitting path PT1. It is noted that the input-shaft rotational speed Nin represents a rotational speed of the input shaft 22 and that the output-shaft rotational speed Nout represents a rotational speed of the output shaft 30.

The vehicle 10 can run in a selected one of the gear running mode and the belt running mode. The gear running mode is a running mode in which the vehicle 10 runs with the drive force being transmitted through the first drive-force transmitting path PT1 that is established in the drive-force transmitting apparatus 16. The belt running mode is a running mode in which the vehicle 10 runs with the drive force being transmitted through the second drive-force transmitting path PT2 that is established in the drive-force transmitting apparatus 16. When forward running of the vehicle 10 is to be made in the gear running mode, the first clutch C1 and the dog clutch D1 are engaged while the second clutch C2 and the first brake B1 are released. When reverse running of the vehicle 10 is to be made in the gear running mode, the first brake B1 and the dog clutch D1 are engaged while the second clutch C2 and the first clutch C1 are released. In the belt running mode, forward running of the vehicle 10 can be made.

The gear running mode is selected to be established when the vehicle 10 runs at a running speed within a relative low speed range or when the vehicle 10 is stopped. The belt running mode is selected to be established when the vehicle 10 runs at a running speed within a relatively high speed range including a middle speed range as well as a high speed range. When the belt running mode is established in the middle speed range, the dog clutch D1 is engaged. When the belt running mode is established in the high speed range, the dog clutch D1 is released, for example, for the purpose of avoiding drag of the gear mechanism 28 and other elements during running of the vehicle 10 in the belt running mode and preventing gears of the gear mechanism 28 and components (such as pinion gears) of the planetary gear device 26p from being rotated at high speeds.

The vehicle 10 is provided with the electronic control apparatus 90 as a controller including the control apparatus constructed according to present invention. For example, the electronic control apparatus 90 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 90 is configured to perform, for example, an engine control operation for controlling an output of the engine 12, a shifting control operation and a belt-clamping-force control operation for the continuously-variable transmission mechanism 24, and a hydraulic-pressure control operation for switching the operation state of each of the plurality of engagement devices (C1, B1, C2, D1). The electronic control apparatus 90 may be constituted by two or more control units exclusively assigned to perform different control operations such as the engine control operation and the hydraulic-pressure control operation.

The electronic control apparatus 90 receives various input signals based on values detected by respective sensors provided in the vehicle 10. Specifically, the electronic control apparatus 90 receives: an output signal of an engine speed sensor 70 indicative of an engine rotational speed Ne which is a rotational speed of the engine 12; an output signal of a primary speed sensor 72 indicative of a primary rotational speed Npri which is a rotational speed of the primary shaft 58 which is equivalent to an input-shaft rotational speed Nin; an output signal of a secondary speed sensor 74 indicative of a secondary rotational speed Nsec which is a rotational speed of the secondary shaft 62; an output signal of an output speed sensor 76 indicative of an output-shaft rotational speed Nout which is a rotational speed of the output shaft 30 and which corresponds to the running speed V of the vehicle 10; an output signal of an accelerator-operation amount sensor 78 indicative of an accelerator operation amount θacc which represents an amount of accelerating operation made by a vehicle operator; an output signal of a throttle-opening degree sensor 80 indicative of the throttle opening degree tap; and an output signal of a shift position sensor 82 indicative of an operation position POSsh of a manually-operated shifting member in the form of a shift lever 84 provided in the vehicle 10. Further, the electronic control apparatus 90 generates various output signals which are supplied to various devices such as the engine control device 42 and the hydraulic control unit 46 and which include an engine-control command signal Se for controlling the engine 12, a hydraulic control command signal Scvt for performing hydraulic controls such as controls of the shifting action and the belt clamping force of the continuously-variable transmission mechanism 24, and a hydraulic-control command signal Scbd for performing hydraulic controls such as controls of operation states of the plurality of engagement devices. It is noted that the input-shaft rotational speed Nin (=primary rotational speed Npri) is equivalent to a rotational speed of the turbine impeller 20t of the of the torque converter 20. It is also noted that the primary rotational speed Npri is equivalent to a rotational speed of the primary pulley 60 and that the secondary rotational speed Nsec is equivalent to a rotational speed of the secondary pulley 64. Further, the electronic control apparatus 90 calculates an actual gear ratio γcvt (=Npri/Nsec) that is an actual value of the gear ratio γcvt of the continuously-variable transmission mechanism 24, based on the primary rotational speed Npri and the secondary rotational speed Nsec.

The shift lever 84 is operable to be placed in a selected one of a plurality of operation positions POSsh that consist of, for example, a parking position P, a reverse position R, a neutral position N and a drive position D. With the shift lever 84 being placed in the parking position P, the drive-force transmitting apparatus 16 is placed in its parking position in which the drive-force transmitting apparatus 16 is placed in its neutral state and rotation of the output shaft 30 is mechanically inhibited (locked). The drive-force transmitting apparatus 16 is placed in the neutral state, for example, by releasing all of the first clutch C1, first brake B1 and second clutch C2. That is, the neutral state is a state of the drive-force transmitting apparatus 16 in which neither the first drive-force transmitting path PT1 nor the second drive-force transmitting path PT2 is established. With the shift lever 84 being placed in the reverse position R, the drive-force transmitting apparatus 16 is placed in its reverse drive position for enabling the reverse running of the vehicle 10 in the gear running mode. With the shift lever 84 being placed in the neutral position N, the drive-force transmitting apparatus 16 is placed in its neutral position in which the drive-force transmitting apparatus 16 is placed in its neutral state. With the shift lever 84 being placed in the drive position D, the drive-force transmitting apparatus 16 is placed in its forward drive position for enabling the forward running of the vehicle 10 in the gear running mode, or enabling the forward running of the vehicle 10 in the belt running mode with execution of an automatic shifting control of the continuously-variable transmission mechanism 24.

For performing various control operations in the vehicle 10, the electronic control apparatus 90 includes an engine control means or portion in the form of an engine control portion 92, a transmission shifting control means or portion in the form of a transmission shifting control portion 94 and a state determining means or portion in the form of a state determining portion 96.

The engine control portion 92 calculates a required drive force Fdem, for example, by applying the accelerator operation amount θacc and the running velocity V to a predetermined or stored relationship (e.g., drive force map) that is obtained by experimentation or determined by an appropriate design theory. The engine control portion 92 sets a target engine torque Tet that ensures the required drive force Fdem, and outputs the engine-control command signal Se for controlling the engine 12 so as to obtain the target engine torque Tet. The outputted engine-control command signal Se is supplied to the engine control device 42.

When the operation position POSsh of the shift lever 84 is the parking position P or the neutral position N during stop of the vehicle 10, the transmission shifting control portion 94 supplies, to the hydraulic control unit 46, the hydraulic-control command signal Scbd requesting engagement of the dog clutch D1, in preparation of transition to the gear running mode. When the operation position POSsh is switched from the parking position P or the neutral position N to the drive position D during stop of the vehicle 10, the transmission shifting control portion 94 supplies, to the hydraulic control unit 46, the hydraulic-control command signal Scbd requesting engagement of the first clutch C1, whereby the gear running mode is established to enable forward running of the vehicle 10. When the operation position POSsh is switched from the parking position P or the neutral position N to the reverse position R during stop of the vehicle 10, the transmission shifting control portion 94 supplies, to the hydraulic control unit 46, the hydraulic-control command signal Scbd requesting engagement of the first brake B1, whereby the gear running mode is established to enable reverse running of the vehicle 10.

When the operation position POSsh is the drive position D, the transmission shifting control portion 94 executes a switching control operation for switching the running mode between the gear running mode and the belt running mode. Specifically, the transmission shifting control portion 94 determines whether shifting from one of first and second speed positions to the other is to be executed or not, by applying the running speed V and the accelerator operation amount θacc to a stepped shifting map in which shift-up lines, shift-down lines and hysteresis between each of the shift-up lines and a corresponding one of the shift-down lines are defined. The first speed position corresponds to the above-described gear ratio EL provided in the gear mechanism 28 by which the drive force is to be transmitted through the first drive-force transmitting path PT1 during the gear running mode. The second speed position corresponds to the above-described highest gear ratio γmax that is the highest one of the gear ratios (or that is a maximum value within a given range of a continuously-variable gear ratio) provided in the continuously-variable transmission mechanism 24 by which the drive force is to be transmitted through the second drive-force transmitting path PT2 during the belt running mode. Then, when determining that the shifting is to be executed, the transmission shifting control portion 94 switches the running mode from one of the gear running mode and the belt running mode to the other, so as to execute shifting up or down from one of the first and second speed positions to the other.

When determining that the running mode is to be switched from the gear running mode to the belt running mode so as to execute the shifting up from the first speed position to the second speed position during running in the gear running mode, the transmission shifting control portion 94 supplies, to the hydraulic control unit 46, the hydraulic-control command signal Scbd requesting releasing and engaging actions of the respective first and second clutches C1, C2, so as to perform a so-called "clutch to clutch" shifting operation. As a result of the shifting up from the first speed position to the second speed position, the second drive-force transmitting path PT2 is established in place of the first drive-force transmitting path PT1 in the drive-force transmitting apparatus 16. Thus, the transmission shifting control portion 94 executes a stepped shifting control to release and engage the first and second clutches C1, C2, respectively, so as to cause the drive-force transmitting apparatus 16 to execute the shift-up action by which the selected running mode (i.e., selected state) is switched from the gear running mode (i.e., first state) in which the first drive-force transmitting path PT1 is established to the belt running mode (i.e., second state) in which the second drive-force transmitting path PT2 is established. In the following description relating to the present embodiment, the shift-up action, which is executed by the drive-force transmitting apparatus 16 to switch the selected running mode from the gear running mode to the belt running mode, will be referred to as "stepped shift-up action".

When determining that the running mode is to be switched from the belt running mode to the gear running mode so as to execute the shifting down from the second speed position to the first speed position during running in the belt running mode, the transmission shifting control portion 94 supplies, to the hydraulic control unit 46, the hydraulic-control command signal Scbd requesting releasing and engaging actions of the respective second and first clutches C2, C1, so as to perform the clutch to clutch shifting operation. As a result of the shifting down from the second speed position to the first speed position, the first drive-force transmitting path PT1 is established in place of the second drive-force transmitting path PT2 in the drive-force transmitting apparatus 16. Thus, the transmission shifting control portion 94 executes a stepped shifting control to engage and release the first and second clutches C1, C2, respectively, so as to cause the drive-force transmitting apparatus 16 to execute the shift-down action by which the selected running mode is switched from the belt running mode in which the second drive-force transmitting path PT2 is established to the gear running mode in which the first drive-force transmitting path PT1 is established. In the following description relating to the present embodiment, the shift-down action, which is executed by the drive-force transmitting apparatus 16 to switch the selected running mode from the belt running mode to the gear running mode, will be referred to as "stepped shift-down action".

In the switching control operation for switching the running mode between the gear running mode and the belt running mode, the switching between the first and second drive-force transmitting paths PT1, PT2 is made by only the above-described clutch to clutch shifting operation for making a torque transfer via an transition state in which the dog clutch D1 is engaged in the belt running mode in the middle speed range, so that the switching control operation is performed with a shifting shock being restrained.

For executing a shifting action in the continuously-variable transmission mechanism 24 during the belt running mode, the transmission shifting control portion 94 supplies, to the hydraulic control unit 46, the hydraulic-control command signal Scvt for controlling the primary pressure Pin and the secondary pressure Pout such that the target gear ratio γcvttgt is established in the continuously-variable transmission mechanism 24 while the belt slippage is not caused in the continuously-variable transmission mechanism 24. This hydraulic-control command signal Scvt includes a primary-pressure command signal Spin requesting the primary pressure Pin to become a target primary pressure Pintgt and a secondary-pressure command signal Spout requesting the secondary pressure Pout to become a target secondary pressure Pouttgt.

The target primary pressure Pintgt is a target pulley hydraulic-pressure by which a primary target thrust Wintgt that is a target value of the primary thrust Win applied to the primary pulley 60 is generated. The target secondary pressure Pouttgt is a target pulley hydraulic-pressure by which a secondary target thrust Wouttgt that is a target value of the secondary thrust Wout applied to the secondary pulley 64 is generated. In calculation of each of the primary target thrust Wintgt and the secondary target thrust Wouttgt, a required thrust, which is minimally required to prevent the belt slippage on a corresponding one of the primary and secondary pulleys 60, 64, is taken into consideration. This required thrust is a belt-slip limit thrust Wlmt that is a thrust value shortly before occurrence of the belt slippage in the continuously-variable transmission mechanism 24. In the following description relating to the present invention, the belt-slip limit thrust Wlmt will be referred to as "slip limit thrust Wlmt".

Figure 6:
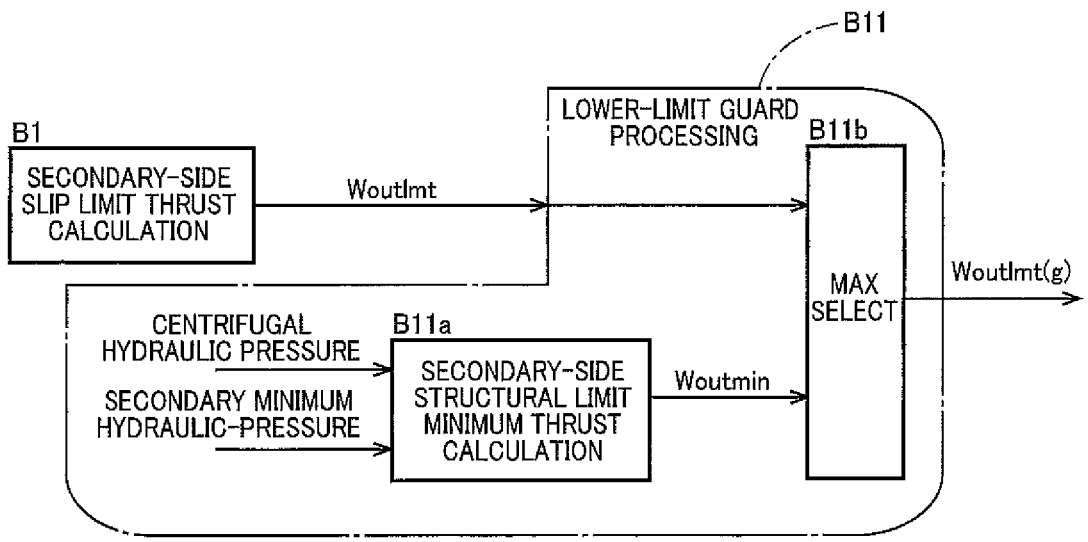
FIG. 6 is a block diagram showing, by way of example, an arrangement for a control performed at block B11 in FIG. 5.
Figure 7:
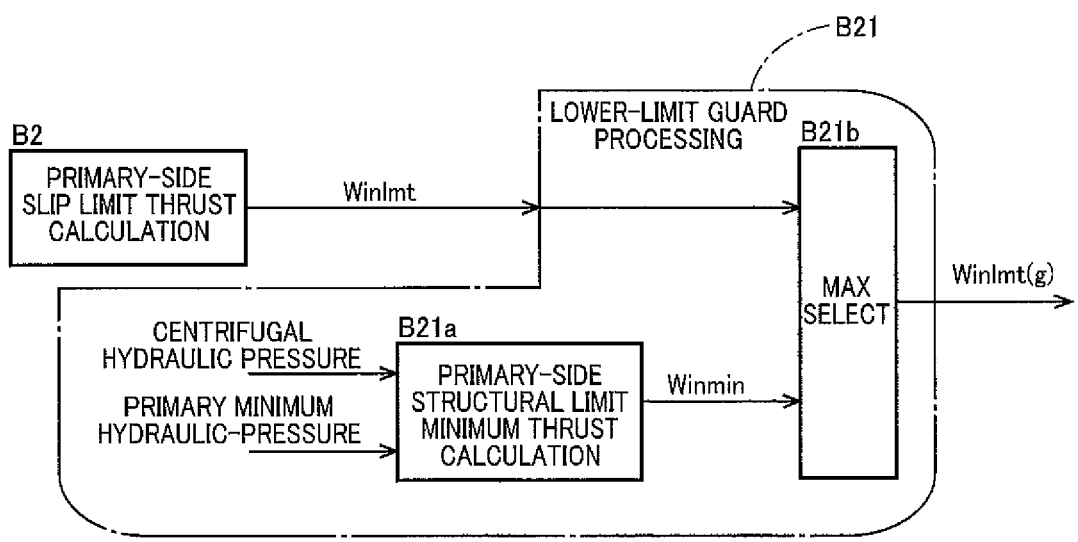
FIG. 7 is a block diagram showing, by way of example, an arrangement for a control performed at block B21 in FIG. 5.

The transmission shifting control portion 94 compares the secondary thrust Wout, which is calculated based on a primary-side slip limit thrust Winlmt that is the slip limit thrust Wlmt minimally required to prevent slippage of the transmission belt 66 on the primary pulley 60, with a secondary-side slip limit thrust Woutlmt that is the slip limit thrust Wlmt minimally required to prevent slippage of the transmission belt 66 on the secondary pulley 64, and then selects a larger one of the secondary thrust Wout and the secondary-side slip limit thrust Woutlmt. The secondary thrust Wout, which is calculated based on the primary-side slip limit thrust Winlmt, is a secondary-side shifting-control thrust Woutsh that is required to be applied to the second pulley 64 in a shifting control, as described below. It is noted that the primary-side slip limit thrust Winlmt is used in determination of a primary-side lower-limit thrust Winlmt (g) (that is a lower limit value of the primary thrust Win) that is obtained through a lower-limit guard processing, as shown in FIG. 7, and that the secondary-side slip limit thrust Woutlmt is used in determination of a secondary-side lower-limit thrust Woutlmt(g) (that is a lower limit value of the secondary thrust Wout) that is obtained through a lower-limit guard processing, as shown in FIG. 6.

The transmission shifting control portion 94 sets, as the primary target thrust Wintgt, the primary thrust Win calculated based on the secondary target thrust Wouttgt. The primary thrust Win, which is calculated based on the secondary target thrust Wouttgt, is a primary-side shifting-control thrust Winsh that is required to be applied to the primary pulley 60 in a shifting control, as described below. Further, as described below, the transmission shifting control portion 94 compensates the primary-side shifting-control thrust Winsh, namely, compensates the primary target thrust Wintgt, by a feedback control of the primary thrust Win that is executed based on a gear ratio deviation Δγcvt (=γcvttgt−γcvt) that is a deviation of the actual gear ratio γcvt from the target gear ratio γcvttgt.

In the above-described compensation of the primary-side shifting-control thrust Winsh, a deviation of an actual value from a target value in each parameter that has a one-to-one correspondence relationship with the gear ratio γcvt may be used in place of the gear ratio deviation Δγcvt. For example, in the compensation of the primary-side shifting-control thrust Winsh, it is possible to use a deviation ΔXin (=Xintgt−Xin) of an actual position Xin of the movable sheave 60b from a target position Xintgt of the movable sheave 60b in the primary pulley 60 (see FIG. 2), a deviation ΔXout (=Xoutgt−Xout) of an actual position Xout of the movable sheave 64b from a target position Xintgt of the movable sheave 64b in the secondary pulley 64 (see FIG. 2), a deviation ΔRin (=Rintgt−Rin) of an actual belt-winding diameter (actual effective diameter) Rin from a target belt-winding diameter (target effective diameter) Rintgt in the primary pulley 60 (see FIG. 2), a deviation ΔRout (=Routtgt−Rout) of an actual belt-winding diameter (actual effective diameter) Rout from a target belt-winding diameter (target effective diameter) Routtgt in the secondary pulley 64 (see FIG. 2), and a deviation ΔNpri (=Npritgt−Npri) of an actual primary rotational speed Npri from a target primary rotational speed Npritgt.

Each of the above-described primary-side shifting-control thrust Winsh and secondary-side shifting-control thrust Woutsh is a thrust required to be applied to a corresponding one of the primary and secondary pulleys 60, 64 in a shifting control to execute a desired shifting action to establish the target gear ratio γcvttgt at a target shifting speed dytgt (that is a target value of a shifting speed dy). The shifting speed dy is a rate (=dγcvt/dt) of change of the gear ratio γcvt, namely, an amount (=dγcvt/dt) of change of the gear ratio γcvt per a unit of time. In the present embodiment, the shifting speed dy is defined as an amount (=dX/dNelm) of pulley displacement per an element of the transmission belt 66, wherein "dX" represents an amount of displacement of the pulley in an axial direction of the pulley per a unit of time, and "dNelm" represents a number of elements (of the transmission belt 66) that are caused to bite into the pulley (i.e., caused to enter the V-shaped groove of the pulley) per the unit of time. The shifting speed dy is represented by a primary shifting speed dyin (=dXin/dNelmin) and a secondary shifting speed dyout (=d Xout/dNelmout).

The thrust, which is applied to each of the pulleys 60, 64 in a steady state in which the gear ratio γcvt is constant, is referred to as "balance thrust Wbl" that is referred also to as "steady thrust". The thrust ratio τ is represented as a ratio (=Woutbl/Winbl) of a secondary balance thrust Woutbl to a primary balance thrust Winbl, wherein the secondary balance thrust Woutbl is the balance thrust Wbl of the secondary pulley 64 and the primary balance thrust Winbl is the balance thrust Wbl of the primary pulley 60. On the other hand, in the steady state, if one of the thrusts applied to the respective pulleys 60, 64 is increased or reduced by a certain amount, the steady state is lost whereby the gear ratio γcvt is changed thereby generating the shifting speed dy that corresponds to the certain amount by which the one of the thrusts is increased or reduced. The certain amount, by which the thrust is increased or reduced, will be referred to as "gear-ratio changing thrust ΔW" that is referred also to as "transient thrust". Where the gear ratio γcvt is changed to the target gear ratio γcvttgt by changing the thrust applied to the primary pulley 60, the gear-ratio changing thrust ΔW is represented by a primary gear-ratio changing thrust ΔWin that corresponds to an amount by which the thrust applied to the primary pulley 60 is increased or reduced. Where the gear ratio γcvt is changed to the target gear ratio γcvttgt by changing the thrust applied to the secondary pulley 64, the gear-ratio changing thrust ΔW is represented by a secondary gear-ratio changing thrust ΔWout that corresponds to an amount by which the thrust applied to the secondary pulley 64 is increased or reduced.

Where one of the primary-side shifting-control thrust Winsh and secondary-side shifting-control thrust Woutsh, which are thrusts required to be applied to the respective primary and secondary pulleys 60, 64 in a shifting control, has been set, the other of the primary-side shifting-control thrust Winsh and secondary-side shifting-control thrust Woutsh is set to a sum of the balance thrust Wbl and the gear-ratio changing thrust ΔW, wherein the balance thrust Wbl is dependent on the above-described one of the primary-side shifting-control thrust Winsh and secondary-side shifting-control thrust Woutsh and the thrust ratio τ corresponding to the target gear ratio γcvttgt, and the gear-ratio changing thrust ΔW corresponds to the target shifting speed dytgt of change of the target gear ratio γcvttgt. The target shifting speed dytgt is represented by a primary target shifting speed dyintgt and a secondary target shifting speed dyouttgt. The primary gear-ratio changing thrust ΔWin is a positive value (ΔWin>0) that is larger than zero in a shift-up state in which the gear ratio γcvt is to be reduced, and is a negative value (ΔWin<0) that is smaller than zero in a shift-down state in which the gear ratio γcvt is to be increased. The primary gear-ratio changing thrust ΔWin is zero (ΔWin=0) in a steady state in which the gear ratio γcvt is constant. Further, the secondary gear-ratio changing thrust ΔWout is a negative value (ΔWout<0) that is smaller than zero in the shift-up state, and is a positive value (ΔWout>0) that is larger than zero in the shift-down state. The secondary gear-ratio changing thrust ΔWout is zero (ΔWout=0) in the steady state.

Figure 3:
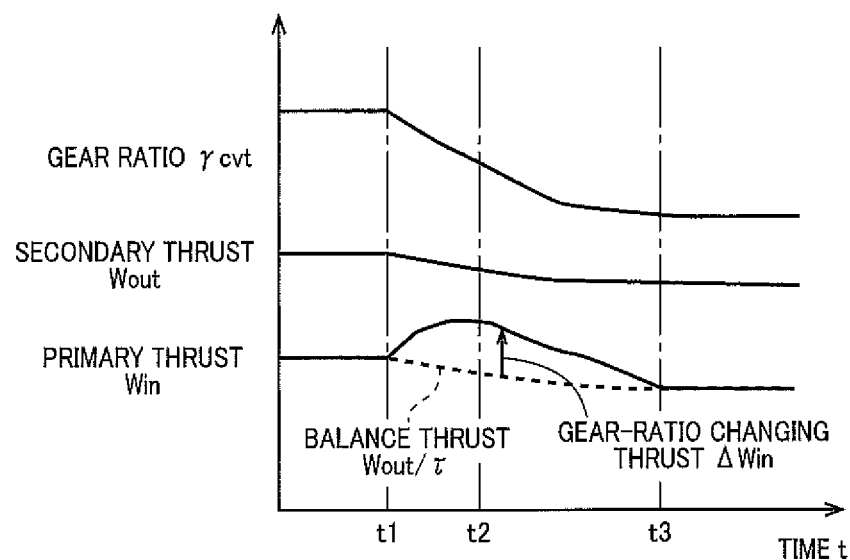
FIG. 3 is a view showing an example for explaining thrusts required for a shifting control.
Figure 4:
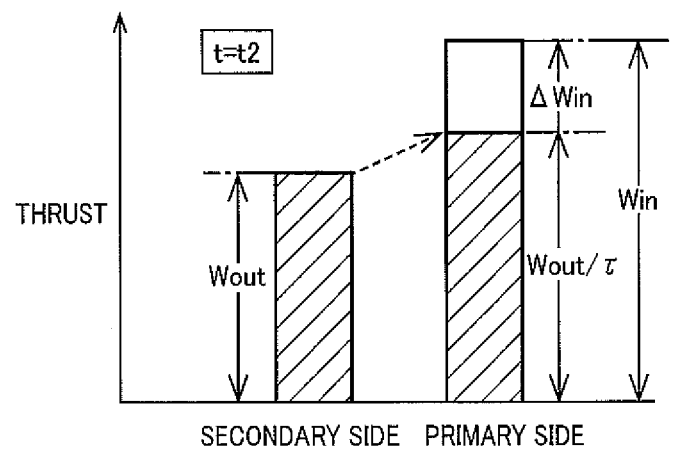
FIG. 4 is a view showing, by way of example, a relationship between the thrusts at a point t2 of time shown in FIG. 3.

FIG. 3 is a view showing an example for explaining thrusts required for a shifting control. FIG. 4 is a view showing, by way of example, a relationship between the thrusts at a point t2 of time shown in FIG. 3. FIGS. 3 and 4 show, by a way of example, the primary thrust Win that is set in a case where a desired shift-up action is executed by increasing the primary thrust Win while setting the secondary thrust Wout to prevent a belt slippage on the secondary pulley 64. As shown in FIG. 3, at a stage until a point t1 of time and a stage from a point t3 of time, namely, in the steady state in which the target gear ratio γcvttgt is constant with the primary gear-ratio changing thrust ΔWin is zero, the primary thrust Win consists of only the primary balance thrust Winbl (=Wout/τ). At a stage from the point t1 of time until the point t3 of time, namely, in the shift-up state in which the target gear ratio γcvttgt is reduced, the primary thrust Win corresponds to a sum of the primary balance thrust Winbl and the primary gear-ratio changing thrust ΔWin, as shown in FIG. 4. In FIG. 4, a hatched portion of each of the primary and secondary thrusts Win, Wout corresponds to a corresponding one of the primary and secondary balance thrusts Winbl, Woutbl that are required at the point t2 of time shown in FIG. 3 to maintain the target gear ratio γcvttgt.

Figure 5:
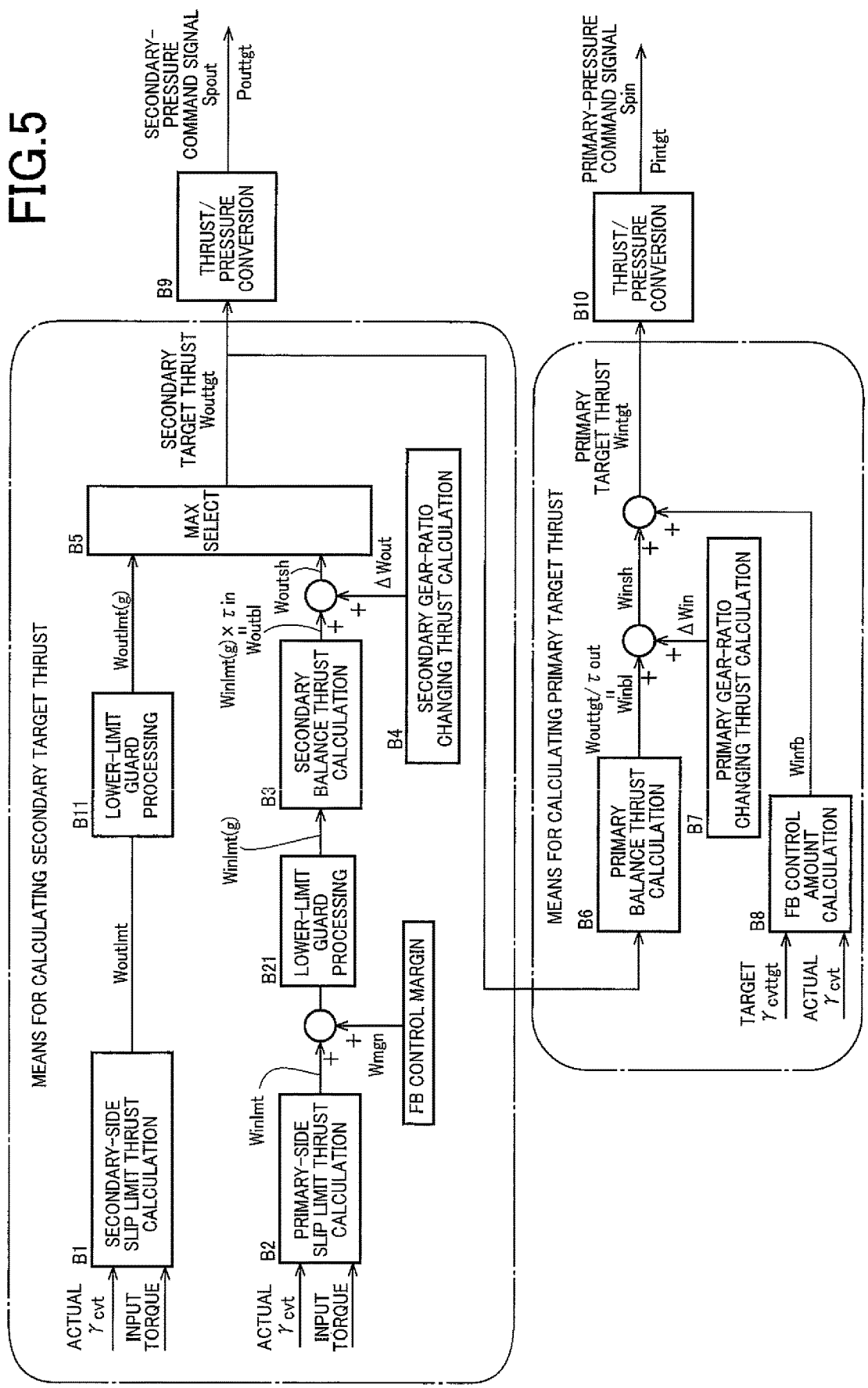
FIG. 5 is a block diagram showing an arrangement for controls performed to prevent a belt slippage and establish a target gear ratio, with minimally required thrusts.

FIG. 5 is a block diagram showing an arrangement for controls performed to prevent a belt slippage and execute a desired shifting action, with minimally required thrusts. In FIG. 5, the transmission shifting control portion 94 calculates the target gear ratio γcvttgt. Specifically, the transmission shifting control portion 94 calculates the target primary rotational speed Npritgt by applying the accelerator operation amount θacc and the vehicle running speed V into a predetermined relationship in the form of a CVT shifting map. Then, the transmission shifting control portion 94 calculates, based on the target primary rotational speed Npritgt, a post-shifting target gear ratio γcvttgtl (=Npritgt/Nsec) that is the gear ratio γcvt to be established after the shifting action executed in the continuously-variable transmission mechanism 24. In order that the shifting action is executed rapidly and smoothly, the transmission shifting control portion 94 determines the target gear ratio γcvttgt as a transient target value of the gear ratio γcvt in process of the shifting action, based on a pre-shifting gear ratio γcvt (i.e., gear ratio γcvt before the shifting action) and the post-shifting target gear ratio γcvttgtl, according to a relationship predetermined to cause the shifting action to be executed rapidly and smoothly. For example, the transmission shifting control portion 94 determines the target gear ratio γcvttgt (that is to be changed in process of the shifting action) as a function that is changed, along a curved line whose inclination is smoothly changed, toward the post-shifting target gear ratio γcvttgtl, with lapse of time from initiation of the shifting action. This smoothly curved line is, for example, a first-order lag curve or a second-order lag curve. When determining the target gear ratio γcvttgt, the shifting control portion 94 calculates the target shifting speed dytgt, based on the target gear ratio γcvttgt as the time function. When the target gear ratio γcvttgt becomes constant upon completion of the shifting action, namely, when the continuously-variable transmission mechanism 24 is brought back into the steady state, the shifting speed dytgt becomes zero.

The transmission shifting control portion 94 calculates an input torque Tin inputted to the continuously-variable transmission mechanism 24. To this end, the transmission shifting control portion 94 calculates an estimated value of the engine torque Te, for example, by applying the throttle opening degree tap and the engine rotational speed Ne to a predetermined relationship such as an engine torque map. The transmission shifting control portion 94 calculates a turbine torque Tt, based on the estimated value of the engine torque Te and a predetermined relationship such as characteristic of the torque converter 20. The transmission shifting control portion 94 handles the calculated turbine torque Tt as the input torque Tin is a torque acting on the primary shaft 58.

At each of blocks B1 and B2 shown in FIG. 5, the transmission shifting control portion 94 calculates the slip limit thrust Wlmt, based on the actual gear ratio γcvt and the input torque Tin inputted to the continuously-variable transmission mechanism 24. Specifically, the transmission shifting control portion 94 calculates the secondary-side slip limit thrust Woutlmt, by using an equation (1) given below, and calculates the primary-side slip limit thrust Winlmt, by using an equation (2). In the equations (1) and (2), "Tin" represents the input torque Tin of the continuously-variable transmission mechanism 24, which is be inputted to the primary pulley 60; "Tout" represents an output torque of the continuously-variable transmission mechanism 24, which corresponds to an input torque to be inputted to the secondary pulley 64; "α" represents a sheave angle of each of the pulleys 60, 64 (see FIG. 2), "μin" repsresnts an element/pulley friction coefficient in the primary pulley 60 (i.e., friction coefficient between the transmission belt 66 and the primary pulley 60 ), "μout" represents an element/pulley friction coefficient in the secondary pulley 64 (i.e., friction coefficient between the transmission belt 66 and the secondary pulley 64 ), "Rin" represents ½ of the belt winding diameter (effective diameter) of the primary pulley 60, which is uniquely calculated based on the actual gear ratio γcvt (see FIG. 2), and "Rout" represents ½ of the belt winding diameter (effective diameter) of the secondary pulley 64, which is uniquely calculated based on the actual gear ratio γcvt (see FIG. 2). It is noted that a relationship between the input torque Tin and the output torque Tout is represented by an equation that is Tout=γcvt×Tin=(Rout/Rin)×Tin.

$$Woutlmt = (Tout \times \cos\alpha)/(2 \times \mu out \times Rout) \quad (1)$$
$$= (Tin \times \cos\alpha)/(2 \times \mu out \times Rin)$$

$$Winlmt = (Tin \times \cos\alpha)/(2 \times \mu in \times Rin) \quad (2)$$

At each of blocks B11 and B21 shown in FIG. 5, the transmission shifting control portion 94 calculates the lower-limit thrust Wlmt (g), by causing the calculated slip limit thrust Wlmt to be subjected to the lower-limit guard processing. FIG. 6 is a block diagram showing, by way of example, an arrangement for a control performed at block B11 in FIG. 5. FIG. 7 is a block diagram showing, by way of example, an arrangement for a control performed at block B21 in FIG. 5.

At block B11a shown in FIG. 6, the transmission shifting control portion 94 calculates a secondary-side hard-limit minimum hydraulic-pressure Poutmin that is a hard-limit minimum hydraulic-pressure of the secondary pulley 64, by adding a secondary minimum hydraulic-pressure to the centrifugal hydraulic pressure acting in a fluid chamber 64d of the hydraulic actuator 64c. The transmission shifting control portion 94 converts the secondary-side hard-limit minimum hydraulic-pressure Poutmin into a secondary-side structural limit minimum thrust Woutmin (=Poutmin×pressure receiving area), based on a pressure receiving area of the secondary hydraulic actuator 64c. The transmission shifting control portion 94 calculates the centrifugal hydraulic pressure acting in the fluid chamber 64d, by applying the secondary rotational speed Nsec, for example, into a predetermined calculation formula. The above-described secondary minimum hydraulic-pressure is a minimum hydraulic pressure, for example, which contains a variation amount of the secondary pressure Pout, and which could be supplied from the hydraulic control unit 46 into the fluid chamber 64d even when the secondary-pressure command signal Spout requesting the secondary pressure Pout to be zero. Thus, the secondary-side structural limit minimum thrust Woutmin is a structural limit minimum thrust which contains the centrifugal thrust acting on the secondary pulley 64 owing the centrifugal hydraulic pressure acting in the fluid chamber 64d, and which structurally acts on the secondary pulley 64. At block B11b shown in FIG. 6, the transmission shifting control portion 94 selects, as the secondary-side lower-limit thrust Woutlmt(g) that is obtained through the lower-limit guard processing, a larger one of the secondary-side slip limit thrust Woutlmt and the secondary-side structural limit minimum thrust Woutmin. Thus, the secondary-side lower-limit thrust Woutlmt(g) is a thrust that is at least not smaller than the centrifugal thrust acting on the secondary pulley 64.

At block B21a a shown in FIG. 7, the transmission shifting control portion 94 calculates a primary-side hard-limit minimum hydraulic-pressure Pinmin that is a hard-limit minimum hydraulic-pressure of the primary pulley 60, by adding a primary minimum hydraulic-pressure to the centrifugal hydraulic pressure acting in a fluid chamber 60d of the hydraulic actuator 60c. The transmission shifting control portion 94 converts the primary-side hard-limit minimum hydraulic-pressure Pinmin into a primary-side structural limit minimum thrust Winmin (=Pinmin×pressure receiving area), based on a pressure receiving area of the primary hydraulic actuator 60c. The transmission shifting control portion 94 calculates the centrifugal hydraulic pressure acting in the fluid chamber 60d, by applying the primary rotational speed Npri, for example, into a predetermined calculation formula. The above-described primary minimum hydraulic-pressure is a minimum hydraulic pressure, for example, which contains a variation amount of the primary pressure Pin, and which could be supplied from the hydraulic control unit 46 into the fluid chamber 60d even when the primary-pressure command signal Spin requesting the primary pressure Pin to be zero. Thus, the primary-side structural limit minimum thrust Winmin is a structural limit minimum thrust which contains the centrifugal thrust acting on the primary pulley 60 owing the centrifugal hydraulic pressure acting in the fluid chamber 60d, and which structurally acts on the primary pulley 60. At block B21b shown in FIG. 7, the transmission shifting control portion 94 selects, as the primary-side lower-limit thrust Winlmt(g) that is obtained through the lower-limit guard processing, a larger one of the primary-side slip limit thrust Winlmt and the primary-side structural limit minimum thrust Winmin. Thus, the primary-side lower-limit thrust Winlmt(g) is a thrust that is at least not smaller than the centrifugal thrust acting in the primary pulley 60.

At each of blocks B3 and B6 shown in FIG. 5, the transmission shifting control portion 94 calculates the balance thrust Wbl. That is, the transmission shifting control portion 94 calculates the secondary balance thrust Woutbl based on the primary-side lower-limit thrust Winlmt(g), and calculates the primary balance thrust Winbl based on the secondary target thrust Wouttgt.

Figure 8:
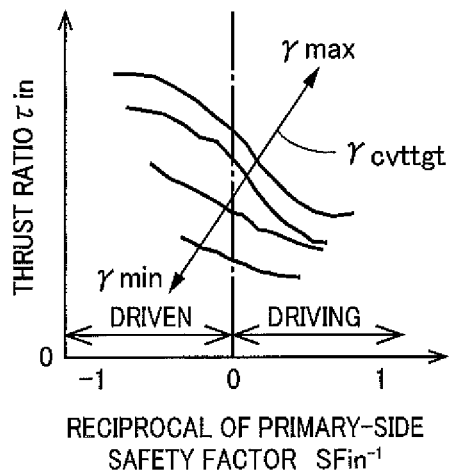
FIG. 8 is a view showing, by way of example, a thrust ratio map for calculating a first value of a thrust ratio, which is used to calculate the thrust to be applied to a secondary pulley.
Figure 9:
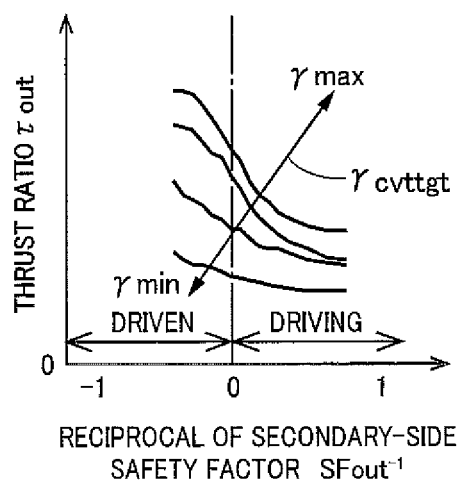
FIG. 9 is a view showing, by way of example, a thrust ratio map for calculating a second value of the thrust ratio, which is used to calculate the thrust to be applied to a primary pulley.

Specifically, the transmission shifting control portion 94 calculates a thrust ratio tin that corresponds to or establishes the target gear ratio γcvttgt, for example, by applying the target gear ratio γcvttgt and a reciprocal SFin$^{-1}$ (=Winlmt/Win) of a primary-side safety factor SFin (=Win/Winlmt) to a thrust ratio map (τin) shown in FIG. 8. The thrust ratio map (τin) is a predetermined relationship between the reciprocal SFin$^{-1}$ of the primary-side safety factor SFin and the thrust ratio τin, with a parameter in the form of the target gear ratio γcvttgt. The thrust ratio τin is a thrust ratio (that corresponds to "first value" recited in the appended claims) that is used to calculate the thrust applied to the secondary pulley 64, based on the thrust applied to the primary pulley 60. The transmission shifting control portion 94 calculates the secondary balance thrust Woutbl based on the primary-side lower-limit thrust Winlmt(g) and the thrust ratio τin, by using equation (3) given below. Further, the transmission shifting control portion 94 calculates a thrust ratio rout that corresponds to or establishes the target gear ratio γcvttgt, for example, by applying the target gear ratio γcvttgt and a reciprocal SFout$^{-1}$ (=Woutlmt/Wout) of a secondary-side safety factor SFout (=Wout/Woutlmt) to a thrust ratio map (τout) shown in FIG. 9. The thrust ratio map (τout) is a predetermined relationship between the reciprocal SFout$^{-1}$ of the secondary-side safety factor SFout and the thrust ratio τout, with a parameter in the form of the target gear ratio γcvttgt. The thrust ratio τout is a thrust ratio (that corresponds to "second value" recited in the appended claims) that is used to calculate the thrust applied to the primary pulley 60, based on the thrust applied to the secondary pulley 64. The transmission shifting control portion 94 calculates the primary balance thrust Winbl based on the secondary target thrust Wouttgt and the thrust ratio τout, by using equation (4) given below. When the vehicle 10 does not drive itself, namely, when the vehicle 10 is being driven, each of the input torque Tin and the output torque Tout is a negative value, so that each of the reciprocals SFin$^{-1}$, SFout$^{-1}$ of the respective safety factors SFin, SFout is also a negative value. Each of the reciprocals SFin$^{-1}$, SFout$^{-1}$ may be calculated each time when the balance thrust Wbl is to be calculated. Or alternatively, where each of the safety factors SFin, SFout is set to a predetermined value (e.g., about 1.0-1.5), each of the reciprocals SFin$^{-1}$, SFout$^{-1}$ may be reciprocals of such safety factor set to the predetermined value.

$$Woutbl = Winlmt(g) \times \tau in \quad (3)$$

$$Winbl = Wouttgt/\tau out \quad (4)$$

As described above, the reciprocals SFin$^{-1}$, SFout$^{-1}$ of the respective safety factors SFin, SFout, based on which the thrust ratios τin, rout are calculated, are values based on the respective slip limit thrusts Winlmt, Woutlmt. Each of the slip limit thrusts Winlmt, Woutlmt is calculated based on the input torque Tin inputted to the continuously-variable transmission mechanism 24 (see equations (1), (2) given above). Therefore, it can be said that the transmission shifting control portion 94 calculates, based on the input torque Tin inputted to the continuously-variable transmission mechanism 24, the thrust ratio τ that corresponds to or establishes the target gear ratio γcvttgt of the continuously-variable transmission mechanism 24.

At each of blocks B4 and B7, the transmission shifting control portion 94 calculates the gear-ratio changing thrust ΔW. That is, the transmission shifting control portion 94 calculates the secondary gear-ratio changing thrust ΔWout and the primary gear-ratio changing thrust ΔWin.

Figure 10:
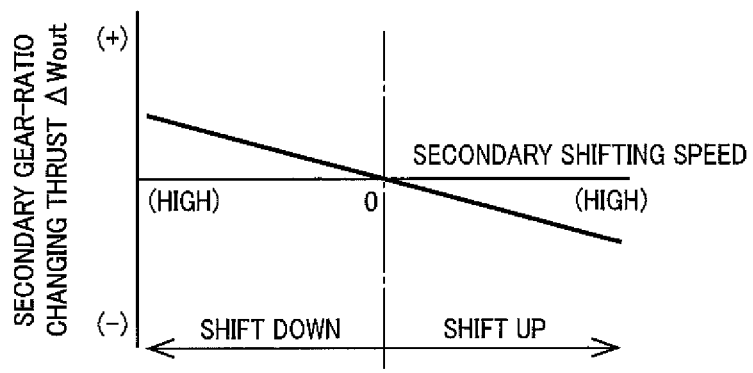
FIG. 10 is a view showing, by way of example, a gear-ratio-changing thrust map for calculating a secondary gear-ratio changing thrust.
Figure 11:
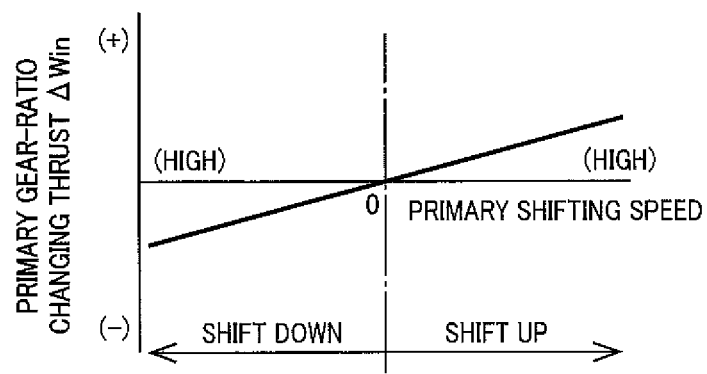
FIG. 11 is a view showing, by way of example, a gear-ratio-changing thrust map for calculating a primary gear-ratio changing thrust.

Specifically, the transmission shifting control portion 94 calculates the secondary gear-ratio changing thrust ΔWout, for example, by applying the secondary target shifting speed dyouttgt to a gear-ratio-changing thrust map (ΔWout) shown in FIG. 10. The gear-ratio-changing thrust map (ΔWout) represents, by way of example, a predetermined relationship between the secondary shifting speed dyout and the secondary gear-ratio changing thrust ΔWout. The transmission shifting control portion 94 calculates, as the secondary thrust required to prevent a belt slippage on the primary pulley 60, a secondary-side shifting-control thrust Woutsh (=Woutbl+ΔWout), by adding the secondary gear-ratio changing thrust ΔWout to the secondary balance thrust Woutbl. Further, the transmission shifting control portion 94 calculates the primary gear-ratio changing thrust ΔWin, for example, by applying the primary target shifting speed dyintgt to a gear-ratio-changing thrust map (ΔWin) shown in FIG. 11. The gear-ratio-changing thrust map (ΔWin) represents, by way of example, a predetermined relationship between the primary shifting speed dyin and the primary gear-ratio changing thrust ΔWin. The transmission shifting control portion 94 calculates a primary-side shifting-control thrust Winsh (=Winbl+ΔWin), by adding the primary gear-ratio changing thrust ΔWin to the primary balance thrust Winbl.

In calculations made at the above-described blocks B3 and B4, a predetermined physical characteristic diagram such as the thrust ratio map (τin) shown in FIG. 8 and the gear-ratio-changing thrust map (ΔWout) shown in FIG. 10 is used. Therefore, in a result of calculation of each of the secondary balance thrust Woutbl and the secondary gear-ratio changing thrust ΔWout, there exists a variation that is dependent on an individual difference of a hard unit such as the hydraulic control unit 46 in terms of physical characteristics. Where such a variation in terms of the physical characteristics is taken into consideration, the shifting control portion 94 may add a control margin Wmgn to the primary-side slip limit thrust Winlmt. The control margin Wmgn is a predetermined thrust that corresponds to the variation in terms of the physical characteristics which could affect the calculation of each of the secondary balance thrust Woutbl and the secondary gear-ratio changing thrust ΔWout. It is noted that the calculation could be affected by the variation in terms of the physical characteristics as well as the variation in term of an actual value of the pulley hydraulic-pressure that is generated in response to the hydraulic-control command signal Scvt, and that the calculation could be affected by the variation in terms of the physical characteristics by a degree, which could be relatively large depending on a kind of hard unit (such as the hydraulic control unit 46) having the individual difference. However, in general, the degree by which the calculation could be affected by the variation in the physical characteristics is extremely small as compared with a degree by which the calculation could be affected by the variation in the actual value of the pulley hydraulic-pressure.

At block B5 shown in FIG. 5, the transmission shifting control portion 94 selects, as the secondary target thrust Wouttgt, a larger one of the secondary-side lower-limit thrust Woutlmt(g) and the secondary-side shifting-control thrust Woutsh.

At block B8 shown in FIG. 5, the transmission shifting control portion 94 calculates a feedback control amount Winfb. Specifically, the transmission shifting control portion 94 calculates a feedback control amount (=FB control amount) Winfb that makes the actual gear ratio γcvt coincident with the target gear ratio γcvttgt, by using a feedback-control formula in the form of equation (5) given below. In the equation (5), "Δγcvt" represents the gear ratio deviation Δγcvt, "Kp" represents a predetermined proportionality constant, "Ki" represents a predetermined integral constant, and "Kd" represents a predetermined differential constant. The transmission shifting control portion 94 calculates, as the primary target thrust Wintgt, an amended value (=Winsh+Winfb) of the feedback control amount Winfb that is amended by a feedback control, by adding the feedback control amount Winfb to the primary-side shifting-control thrust Winsh.

$$Winfb = Kp \times \Delta\gamma cvt + Ki \times (\int \Delta\gamma cvt dt) + Kd \times (d\Delta\gamma cvt/dt) \quad (5)$$

At each of blocks B9 and B10 shown in FIG. 5, the transmission shifting control portion 94 converts the target thrust into a target pulley pressure. Specifically, the transmission shifting control portion 94 converts the primary target thrust Wintgt into a target primary pressure Pintgt (=Wintgt/pressure receiving area), based on the pressure receiving area of the primary hydraulic actuator 60c, and converts the secondary target thrust Wouttgt into a target secondary pressure Pouttgt (=Wouttgt/pressure receiving area), based on the pressure receiving area of the secondary hydraulic actuator 64c. The transmission shifting control portion 94 sets the primary-pressure command signal Spin representing the target primary pressure Pintgt and the secondary-pressure command signal Spout representing the target secondary pressure Pouttgt.

The transmission shifting control portion 94 supplies the hydraulic-control command signal Scvt in the form of the primary-pressure command signal Spin and the secondary-pressure command signal Spout, to the hydraulic control unit 46, for thereby obtaining the target primary pressure Pintgt and the target secondary pressure Pouttgt. The hydraulic control unit 46 regulates the primary pressure Pin and the secondary pressure Pout, in accordance with the supplied hydraulic-control command signal Scvt.

The pulleys 60, 64 of the continuously-variable transmission mechanism 24 are rotated even when the second clutch C2 is completely released. Therefore, also when the second clutch C2 is completely released, it is preferable to control the continuously-variable transmission mechanism 24 such that the target gear ratio γcvttgt is established without a belt slippage being caused in the continuously-variable transmission mechanism 24. Thus, as during the running in the belt running mode, during the running with the second clutch C2 being completed released, the transmission shifting control portion 94 controls the continuously-variable transmission mechanism 24, for example, as shown in the block diagram of FIG. 5. During the running with the second clutch C2 being completely released, the input torque Tin inputted to the continuously-variable transmission mechanism 24 corresponds to a drag torque generated in the second clutch C2. The drag torque of the second clutch C2 corresponds to a torque capacity, namely, a clutch torque of the second clutch C2 in a state in which the second clutch C2 is completely released. During the running with the second clutch C2 being completely released, the transmission shifting control portion 94 sets the input torque Tin of the continuously-variable transmission mechanism 24 to a predetermined torque value corresponding to the drag torque of the second clutch C2.

If the drag torque of the second clutch C2 is fluctuated, an actual value of the input torque Tin inputted to the continuously-variable transmission mechanism 24 is deviated from the above-described predetermined torque value, the gear ratio γcvt of the continuously-variable transmission mechanism 24 could not be controlled to the target gear ratio γcvttgt. In the present embodiment, when the target gear ratio γcvttgt is the highest gear ratio γmax during the running with the second clutch C2 being completely released, a variation or fluctuation of the drag torque of the second clutch C2 is taken into consideration, and a value ToutA (corresponding to "second-difference increasing value" recited in the appended claims) of the thrust ratio τout, which provides the primary thrust Win facilitating the highest gear ratio γmax to be maintained, is used.

When the target gear ratio γcvttgt is the highest gear ratio γmax during the running with the second clutch C2 being completely released, the transmission shifting control portion 94 sets the thrust ratio τout, which is used when calculating the primary target thrust Wintgt based on the secondary target thrust Wouttgt, such that the thrust ratio τout is set to the above-described value τoutA that causes a difference of the primary target thrust Wintgt and the secondary target thrust Wouttgt to be larger, than a value that corresponds to or establishes the highest gear ratio γmax as the target gear ratio γcvttgt. This value τoutA (=τout+α), which causes the above-described difference to be larger, includes an added value (hereinafter referred to as "thrust-ratio compensation value") α in addition to the value that corresponds to or establishes the highest gear ratio γmax as the target gear ratio γcvttgt, wherein the thrust-ratio compensation value α is determined based on variation of the drag torque of the second clutch C2.

Figure 14:
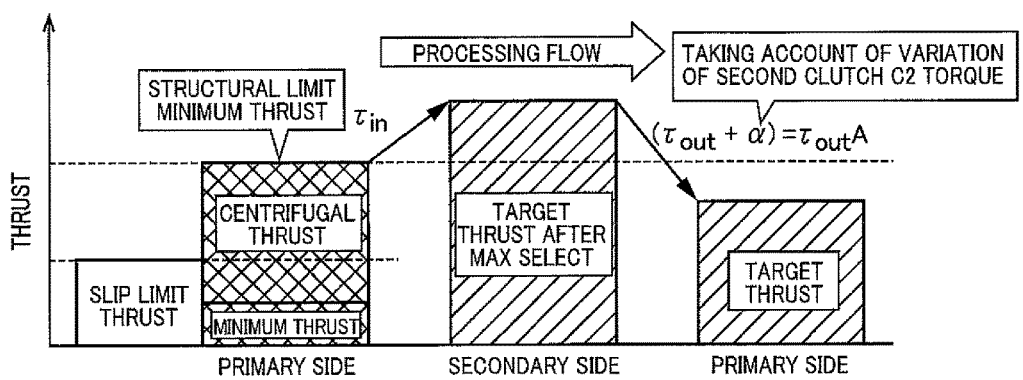
FIG. 14 is a view showing, by way of a comparative example, a flow of processing in which the secondary target thrust is calculated based on the primary-side lower-limit thrust in the steady state in which the gear ratio is kept at the highest gear ratio.

As described above, the secondary target thrust Wouttgt is a larger one of the secondary-side lower-limit thrust Woutlmt(g) and the secondary-side shifting-control thrust Woutsh (see block B5 in FIG. 5). Further, the secondary-side shifting-control thrust Woutsh is calculated based on the primary-side lower-limit thrust Winlmt(g) that is obtained through the lower-limit guard processing to which the primary-side slip limit thrust Winlmt is subjected by the primary-side structural limit minimum thrust Winmin. FIG. 14 is a view showing, by way of a comparative example, a processing in which the secondary target thrust Wouttgt is calculated based on the primary-side lower-limit thrust Winlmt(g) in the steady state in which the gear ratio γcvt is to be kept at the highest gear ratio γmax. In the example shown in FIG. 14, the centrifugal thrust is made large by, for example, a high value of the primary rotational speed Npri, whereby the primary-side structural limit minimum thrust Winmin is made larger than the primary-side slip limit thrust Winlmt, so that the primary-side structural limit minimum thrust Winmin is selected as the primary-side lower-limit thrust Winlmt(g). In the steady state, the secondary target thrust Wouttgt (=Winmin×τin) is calculated based on the primary-side structural limit minimum thrust Winmin and the thrust ratio Tin that corresponds to or establishes the highest gear ratio γmax, and then the primary target thrust Wintgt (=Wouttgt/(τout+α)) is calculated based on the calculated secondary target thrust Wouttgt and the above-described value τoutA that facilitates the highest gear ratio γmax to be maintained. In the example shown in FIG. 14, the calculated primary target thrust Wintgt is made smaller than the primary-side structural limit minimum thrust Winmin, so that, even if the primary-pressure command signal Spin representing the primary target thrust Wintgt is outputted, an actual value of the primary thrust Win is made become the primary-side structural limit minimum thrust Winmin that is larger than the primary target thrust Wintgt. Thus, the gear ratio γcvt of the continuously-variable transmission mechanism 24 cannot be kept at the highest gear ratio γmax.

In the present embodiment, when the target gear ratio γcvttgt is the highest gear ratio γmax during the running with the second clutch C2 being completely released, the transmission shifting control portion 94 sets the thrust ratio τin, which is used when calculating the secondary target thrust Wouttgt based on the primary-side lower-limit thrust Winlmt (g), such that the thrust ratio τin is set to a value τinA (corresponding to "first-difference increasing value" recited in the appended claims) that causes a difference of the primary-side lower-limit thrust Winlmt(g) and the secondary target thrust Wouttgt to be larger, than a value that corresponds to or establishes the highest gear ratio γmax as the target gear ratio γcvttgt. This value τinA (=τin+α), which causes the above-described difference to be larger, includes an added value (hereinafter referred to as "thrust-ratio compensation value") α in addition to the value that corresponds to or establishes the highest gear ratio γmax as the target gear ratio γcvttgt, wherein the thrust-ratio compensation value α is determined based on variation of the drag torque of the second clutch C2.

Figure 12:
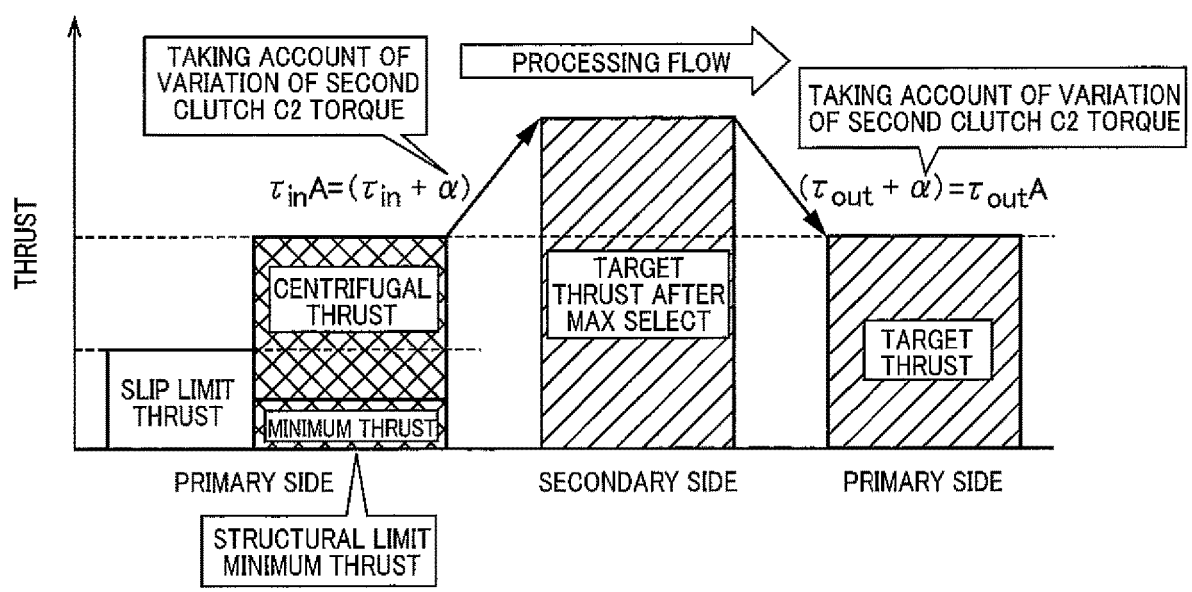
FIG. 12 is a view showing, by way of example according to an embodiment of the present invention, a flow of processing in which a secondary target thrust is calculated based on a primary-side lower-limit thrust in a steady state in which a gear ratio is kept at a highest gear ratio.

FIG. 12 is a view showing, by way of example according to the embodiment of the present invention, a processing in which the secondary target thrust Wouttgt is calculated based on the primary-side lower-limit thrust Winlmt(g) in the steady state in which the gear ratio γcvt is kept at the highest gear ratio γmax. In the example shown in FIG. 12, the primary-side structural limit minimum thrust Winmin is made larger than the primary-side slip limit thrust Winlmt, so that the primary-side structural limit minimum thrust Winmin is selected as the primary-side lower-limit thrust Winlmt(g). In the steady state, the secondary target thrust Wouttgt (=Winmin×(τin+α)) is calculated based on the primary-side structural limit minimum thrust Winmin and the above-described value τinA (=τin+α) which takes account of variation of the drag torque of the second clutch C2 and which reliably establishes the highest gear ratio γmax. Then, the primary target thrust Wintgt (=Wouttgt/(τout+α)) is calculated based on the secondary target thrust Wouttgt and the value τoutA (=τout+α) that facilitates the highest gear ratio γmax to be maintained. In the example shown in FIG. 12, the primary target thrust Wintgt is made not smaller than the primary-side structural limit minimum thrust Winmin. Therefore, by outputting the primary-pressure command signal Spin corresponding to the primary target thrust Wintgt, the gear ratio γcvt of the continuously-variable transmission mechanism 24 can be appropriately kept at the highest gear ratio γmax.

The state determining portion 96 determines whether the vehicle 10 is running with the second clutch C2 being completely released or not. For example, the running with the second clutch C2 being completely released corresponds to running of the vehicle 10 in the gear running mode in which the first drive-force transmitting path PT1 is established, or corresponds to running of the vehicle 10 in the neutral state of the drive-force transmitting apparatus 16.

When determining that the vehicle 10 is running with the second clutch C2 being completely released, the state determining portion 96 determines whether the target gear ratio γcvttgt is set to the highest gear ratio γmax or not.

During the running in the gear running mode, the transmission shifting control portion 94 sets the target gear ratio γcvttgt to the highest gear ratio γmax, so that the gear ratio γcvt of the continuously-variable transmission mechanism 24 is controlled to the highest gear ratio γmax, for preparing for execution of the stepped shift-up action. Upon execution of the stepped shift-up action, it is appropriate that the gear ratio γcvt of the continuously-variable transmission mechanism 24 is made to become the highest gear ratio γmax, in order to restrain an amount of change of the primary rotational speed Npri and maintain a consistency of the drive force upon the execution of the stepped shift-up action.

During the running in the neutral state of the drive-force transmitting apparatus 16, the transmission shifting control portion 94 sets the target gear ratio γcvttgt to a value that is dependent on the running speed V when the running speed V is in a relatively high range, namely, is higher than a threshold value, and sets the target gear ratio γcvttgt to the highest gear ratio γmax when the running speed V is in a relatively low range, namely, is not higher than the threshold value. The above-described value dependent on the running speed V is the target gear ratio γcvttgt that is calculated in accordance with, for example, a CVT shifting map, as the target gear ratio γcvttgt calculated during the running in the belt running mode. In view of switching from the neutral state to the gear running mode or to the belt running mode, the above-described threshold value may be, for example, a value, which is defined as a shifting point in the stepped shifting map that is used for determination as to whether a switching between the gear running mode and the belt running mode is to be made, wherein the shifting point is a point at which the switching is determined to be made. The above-described threshold value may be also a value adjacent to the shifting point.

When the state determining portion 96 determines that the vehicle 10 is running with the second clutch C2 being completely released and that the target gear ratio γcvttgt is set to the highest gear ratio γmax, the transmission shifting control portion 94 sets the thrust ratio τin to the above-described value τinA (corresponding to "first-difference increasing value" recited in the appended claims) that takes account of variation of the drag torque of the second clutch C2, and sets the thrust ratio τout to the above-described value τoutA (corresponding to "second-difference increasing value" recited in the appended claims) that takes account of variation of the drag torque of the second clutch C2.

Even during the running with the second clutch C2 being completely released, if the thrust ratio τout is set to the value τoutA (that takes account of variation of the drag torque of the second clutch C2) when the target gear ratio γcvttgt is not set to the highest gear ratio γmax, the actual gear ratio γcvt could be easily deviated from the target gear ratio γcvttgt toward a higher value. On the other hand, the thrust ratio τin is set to the value τinA taking account of variation of the drag torque of the second clutch C2, in order to calculate the secondary target thrust Wouttgt that makes it possible to obtain the primary target thrust Wintgt providing the primary thrust Win that maintains the target gear ratio γcvttgt, so as to avoid a risk that the primary thrust Win maintaining the target gear ratio γcvttgt could not be obtained due to the primary-side structural limit minimum thrust Winmin.

When the state determining portion 96 determines that the vehicle 10 is running with the second clutch C2 being completely released and that the target gear ratio γcvttgt is set to a value other than the highest gear ratio γmax, the transmission shifting control portion 94 sets the thrust ratio τin to the above-described value τinA (=τin+α) that causes the difference of the primary-side lower-limit thrust Winlmt (g) and the secondary target thrust Wouttgt to be larger, than the value that corresponds to or establishes the target gear ratio γcvttgt., and sets the thrust ratio τout to a value that corresponds to or establishes the target gear ratio γcvttgt.

Figure 13:
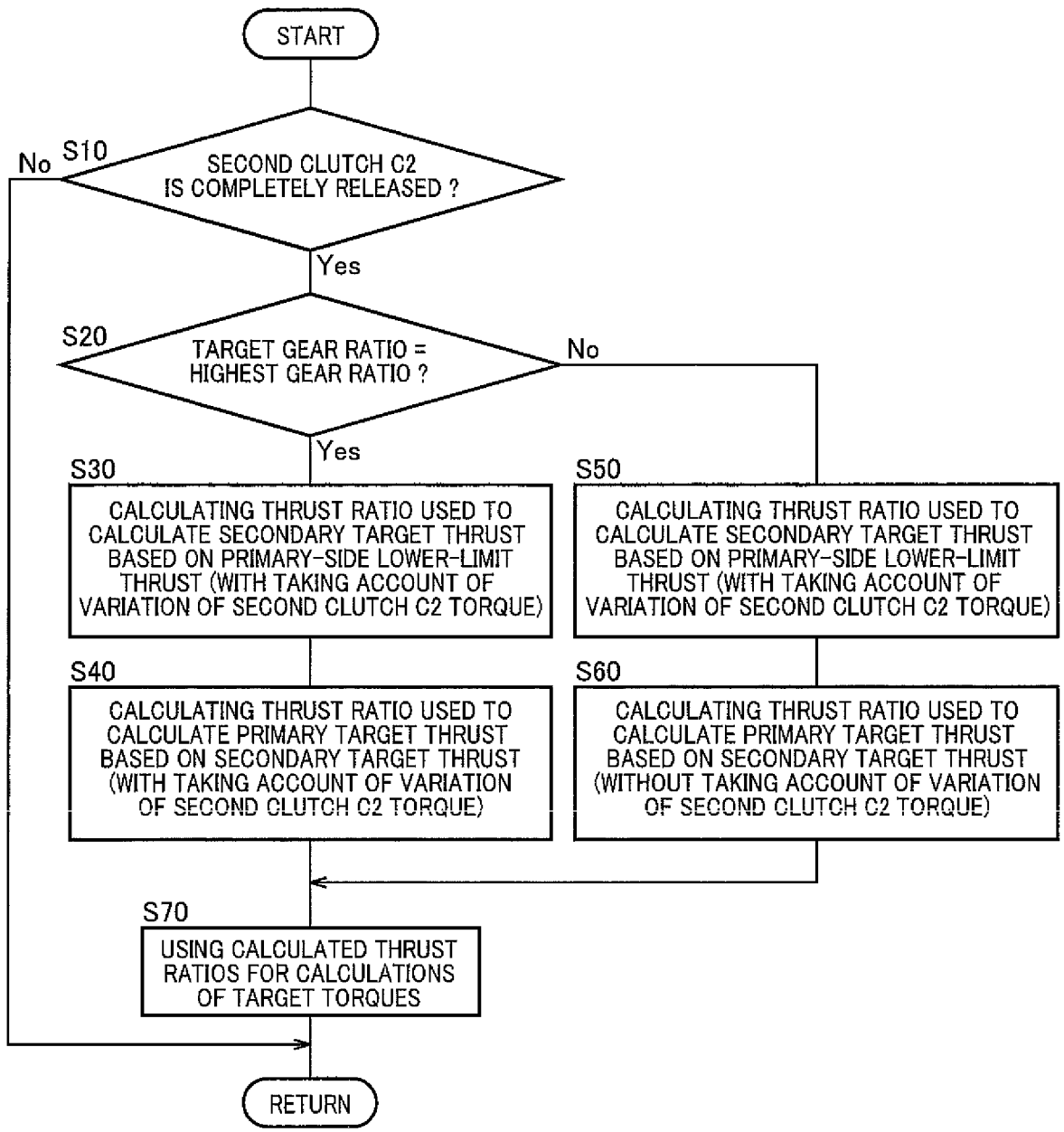
FIG. 13 is a flow chart showing a main part of a control routine executed by the control apparatus, namely, a control routine that is executed for keeping the gear ratio at the highest gear ratio as a target gear ratio during running of the vehicle with a second clutch being completely released.

FIG. 13 is a flow chart showing a main part of a control routine executed by the electronic control apparatus 90, namely, a control routine that is executed for keeping the gear ratio γcvt at the highest gear ratio γmax when the target gear ratio γcvttgt is set to the highest gear ratio γmax during running of the vehicle 10 with the second clutch C2 being completely released. This control routine is repeatedly executed during running of the vehicle 10, for example.

The control routine of FIG. 13 is initiated with step S 10 corresponding to function of the state determining portion 96, to determine whether an operational state of the second clutch C2 is a completely released state or not. That is, at step S10, it is determined whether the vehicle 10 is running with the second clutch C2 being completely released or not. When a negative determination is made at step S10, one cycle of execution of the control routine is completed. When an affirmative determination is made at step S10, step S20 corresponding to function of the state determining portion 96 is implemented to determine whether the target gear ratio γcvttgt is set to the highest gear ratio γmax or not. When an affirmative determination is made at step S20, step S30 corresponding to function of the transmission shifting control portion 94 is implemented to calculate, as the thrust ratio τin that is used when calculating the secondary target thrust Wouttgt based on the primary-side lower-limit thrust Winlmt (g), the above-described value τinA (=τin+α) that takes account of variation of the drag torque of the second clutch C2. Step S30 is followed by step S40 corresponding to function of the transmission shifting control portion 94, which is implemented to calculate, as the thrust ratio τout that is used when calculating the primary target thrust Wintgt based on the secondary target thrust Wouttgt, the above-described value τoutA (=τout+α) that takes account of variation of the drag torque of the second clutch C2. When a negative determination is made at step S20, the control flow goes to step S50 corresponding to function of the transmission shifting control portion 94, which is implemented to calculates, as the thrust ratio τin, the value τinA (=τin+α) that takes account of variation of the drag torque of the second clutch C2. Step S50 is followed by step S60 corresponding to function of the transmission shifting control portion 94, which is implemented to calculates, as the thrust ratio τout which corresponds to or establishes the target gear ratio γcvttgt without taking account of variation of the drag torque of the second clutch C2. Step S40 or S60 is followed by step S70 corresponding to function of the transmission shifting control portion 94, which is implemented to use the thrust ratios τ that have been calculated as described above, in calculations of the secondary target thrust Wouttgt and the primary target thrust Wintgt.

As described above, in the present embodiment, when the target gear ratio γcvttgt is the highest gear ratio γmax during running of the vehicle 10 with the second clutch C2 being completely released, the thrust ratio τin, which is used for calculating the secondary target thrust Wouttgt based on the primary-side lower-limit thrust Winlmt(g), is set to the value τinA (=τin+α) as the first-difference increasing value that causes the difference (first difference) between the primary-side lower-limit thrust Winlmt(g) and the secondary target thrust Wouttgt to be larger, than the value that corresponds to or establishes the highest gear ratio γmax as the target gear ratio γcvttgt, and the thrust ratio τout, which is used when for calculating the primary target thrust Wintgt based on the secondary target thrust Wouttgt, is set to the value τoutA (=τout+α) as the second-difference increasing value that causes the difference (second difference) between the secondary target thrust Wouttgt and the primary target thrust Wintgt to be larger, than the value that corresponds to or establishes the highest gear ratio γmax as the target gear ratio γcvttgt. Thus, the primary target thrust Wintgt is made not smaller than the primary-side lower-limit thrust Winlmt(g), while being made smaller than a thrust value by which the gear ratio γcvt of the continuously-variable transmission mechanism 24 is kept at the highest gear ratio γmax. That is, the thrust ratio τ, which corresponds to a higher gear ratio higher than the highest gear ratio γmax, is obtained, and the secondary target thrust Wouttgt, which makes it possible to obtain the primary target thrust Wintgt that is not smaller than the primary-side lower-limit thrust Winlmt(g), is calculated. Therefore, when the target gear ratio γcvttgt of the continuously-variable transmission mechanism 24 is the highest gear ratio γmax during the running with the second clutch C2 being completely released, it is possible to keep the gear ratio γcvt of the continuously-variable transmission mechanism 24 at the highest gear ratio γmax.

In the present embodiment, when the target gear ratio γcvttgt is not the highest gear ratio γmax during the running with the second clutch C2 being completely released, the thrust ratio τin is set to the value τinA (=τin+α) that causes the difference between the primary-side lower-limit thrust Winlmt(g) and the secondary target thrust Wouttgt to be larger, than the value that corresponds to or establishes the highest gear ratio γmax as the target gear ratio γcvttgt, and the thrust ratio τout is set to the value that corresponds to or establishes the target gear ratio γcvttgt. Thus, the thrust ratio τ, which corresponds to or establishes the target gear ratio γcvttgt, is obtained, and the secondary target thrust Wouttgt, which makes it possible to obtain the primary target thrust Wintgt that is not smaller than the primary-side lower-limit thrust Winlmt(g), is calculated. Further, it is possible to avoid an actual value of the gear ratio γcvt of the continuously-variable transmission mechanism 24 from being deviated from the target gear ratio γcvttgt toward a higher value.

In the present embodiment, during the running with the wet-type frictional engagement device as the second clutch C2 being completely released, the drag torque of the second clutch C2 is handled as the input torque τin inputted to the continuously-variable transmission mechanism 24, and each of the above-described value τinA (=τin+α) and value τoutA (=τout+α) (which cause the above-described respective differences to be larger) contains the thrust-ratio compensation value α as the added value in addition to a corresponding one of the values τin, τout that establish the highest gear ratio γmax as the target gear ratio γcvttgt, wherein the thrust-ratio compensation value α is determined based on variation of the drag torque of the second clutch C2. Thus, the secondary target thrust Wouttgt, which makes it possible to obtain the primary target thrust Wintgt that is not smaller than the primary-side lower-limit thrust Winlmt(g), is appropriately calculated. Further, each of the value τinA (=τin+α) and value τoutA (=τout+α) can be appropriately set.

In the present embodiment, the running with the second clutch C2 being completely released corresponds to running of the vehicle 10 with the first drive-force transmitting path being PT1 being established, and the target gear ratio γcvttgt is set to the highest gear ratio γmax during the running with the first drive-force transmitting path PT1 being established. Thus, it is possible to keep the gear ratio γcvt of the continuously-variable transmission mechanism 24 at the highest gear ratio γmax during the running with the first drive-force transmitting path PT1 being established.

In the present embodiment, the running with the second clutch C2 being completely released corresponds to running of the vehicle 10 in the neutral state of the drive-force transmitting apparatus 16 in which the first clutch C1 as well as the second clutch C2 is released, and the target gear ratio γcvttgt is set to a predetermined value that is dependent on the running speed V during the running in the neutral state with the running speed V being in a relatively high range, and is set to the highest gear ratio γmax during the running in the neutral state with the running speed V that in a relatively low range. Thus, during the running in the neutral state at the running speed V that is in the relatively low range, the gear ratio γcvt of the continuously-variable transmission mechanism 24 can be kept at the highest gear ratio γmax. Further, during the running in the neutral state at the running speed V that is in the relatively high range, an actual value of the gear ratio γcvt of the continuously-variable transmission mechanism 24 can be avoided from being deviated from the target gear ratio γcvttgt toward a higher value.

In the present embodiment, a larger one of (i) the primary-side slip limit thrust Winlmt and (ii) the primary-side structural limit minimum thrust Winmin is selected as the primary-side lower-limit thrust Winlmt(g). Thus, the secondary target thrust Wouttgt, which prevents slippage of the transmission belt 66 on the primary pulley 60 and which provides the primary target thrust Wintgt that is not smaller than the primary-side structural limit minimum thrust Winmin, is calculated.

In the present embodiment, a larger one of (iii) the secondary-side slip limit thrust Woutlmt and (iv) the secondary-side structural limit minimum thrust Woutmin is selected as the secondary-side lower-limit thrust Woutlmt (g), and then a larger one of (v) secondary-side lower-limit thrust Woutlmt(g) and (vi) the secondary-side shifting-control thrust Woutsh that is calculated based on the primary-side lower-limit thrust Winlmt(g), is selected as the secondary target thrust Wouttgt. Thus, the secondary target thrust Wouttgt, which prevents slippage of the transmission belt 66 on the primary pulley 60 and on the secondary pulley 64 and which provides the primary target thrust Wintgt that is not smaller than the primary-side structural limit minimum thrust Winmin, is calculated.

In the present embodiment, the slip limit thrust Wlmt, which is minimally required to prevent slippage in each of the primary and secondary pulleys 60, 64, is calculated based on the gear ratio γcvt of the continuously-variable transmission mechanism 24 and the input torque Ti inputted to the continuously-variable transmission mechanism 24. Thus, the primary target thrust Wintgt, which prevents slippage of the transmission belt 66 on the primary pulley 60, is appropriately calculated. Further, the secondary target thrust Wouttgt, which prevents slippage of the transmission belt 66 on the secondary pulley 64, is appropriately calculated.

In the present embodiment, the continuously-variable transmission mechanism 24, by which the drive force is to be transmitted through the second drive-force transmitting path PT2, provides the continuously-variable gear ratio γcvt that is lower than the gear ratio provided by the gear mechanism 28 by which the drive force is to be transmitted through the first drive-force transmitting path PT1. Thus, when the continuously-variable gear ratio γcvt of the continuously-variable transmission mechanism 24 is set to the highest gear ratio γmax, the gear ratio established in the second drive-force transmitting path PT2 becomes the closest to the gear ratio established in the first drive-force transmitting path PT1.

While the preferred embodiment of this invention has been described in detail by reference to the drawings, it is to be understood that the invention may be otherwise embodied.

For example, in the above-described embodiment, the thrust-ratio compensation value α is added to each of the thrust ratios τin, τout, in view of variation of the drag torque of the second clutch C2. For example, the thrust-ratio compensation value α may be either of a constant value or a value that varies depending on a corresponding one of the thrust ratios τin, τout. Further, the thrust-ratio compensation value α to be added to the thrust ratio τin and the thrust-ratio compensation value α to be added to the thrust ratio τout may be substantially equal to each other, or may be respective values which are different from each other and which are dependent on the respective thrust ratios τin, τout.

The above-described control routine shown in the flow chart of FIG. 13 may be modified as needed. For example, step S30 may be implemented after implementation of step S40, and/or step S50 may be implemented after implementation of step S60.

In the above-described embodiment, the second clutch C2 is disposed in a drive-force transmitting path between the secondary pulley 64 and the output shaft 30. However, this arrangement is not essential. It is possible to employ a modified arrangement in which, for example, the second clutch C2 is disposed in a drive-force transmitting path between the primary pulley 60 and the input shaft 22. In this modified arrangement, the secondary shaft 62 is connected integrally with the output shaft 30, and the primary shaft 58 is connected to the input shaft 22 through the second clutch C2.

In the above-described embodiment, the gear mechanism 28 is a gear mechanism which provides a single gear ratio that is higher than the highest gear ratio γmax of the continuously-variable transmission mechanism 24. However, the gear mechanism 28 may be, for example, a gear mechanism which provides a plurality of different gear ratios. That is, the gear mechanism 28 may be a gear mechanism in which a shifting action is to be executed from one of two or more gear positions to the other. Further, the gear mechanism 28 may be a gear mechanism that provides a gear ratio that is lower than the lowest gear ratio γmin of the continuously-variable transmission mechanism 24 and another gear ratio that is higher than the highest gear ratio γmax of the continuously-variable transmission mechanism 24.

In the above-described embodiment, the running mode of the drive-force transmitting apparatus 16 is switched between the gear running mode and the belt running mode, by using the shifting map in which the shift-up lines and shift-down lines are defined. However, the running mode of the drive-force transmitting apparatus 16 may be switched by setting a gear ratio satisfying the required drive force Fdem that is calculated based on the running speed V and the accelerator operation amount θacc.

In the above-described embodiment, the torque converter 20 is used as fluid-operated drive-force transmitting device. However, in place of the torque converter 20, any one of other types of fluid-operated drive-force transmitting devices such as a fluid coupling, which do not have a torque boosting function, may be used, for example. Further, the fluid-operated drive-force transmitting device does not have to be necessarily provided. In the above-described embodiment, the dog clutch D1 is provided in the first drive-force transmitting path PT1 through which the drive force is to be transmitted by the gear mechanism 28. However, the provision of the dog clutch D1 is not essential for carrying out the invention.

It is to be understood that the embodiment described above is given for illustrative purpose only, and that the present invention may be embodied with various modifications and improvements which may occur to those skilled in the art.

NOMENCLATURE OF ELEMENTS

12: engine (drive force source)
14: drive wheels
16: vehicle drive-force transmitting apparatus
22: input shaft (input rotary member)
24: continuously-variable transmission mechanism
28: gear mechanism 30: output shaft (output rotary member)
60: primary pulley
60c: hydraulic actuator
64: secondary pulley
64c: hydraulic actuator
66: transmission belt (transfer element)
90: electronic control apparatus (control apparatus)
94: transmission shifting control portion
C1: first clutch (first engagement device)
C2: second clutch (second engagement device)
PT1: first drive-force transmitting path
PT2: second drive-force transmitting path

What is claimed is:

1. A control apparatus for a drive-force transmitting apparatus that is to be provided in a vehicle having a drive force source and drive wheels,
wherein the drive-force transmitting apparatus includes:
an input rotary member to which a drive force is to be transmitted from the drive force source;
an output rotary member from which the drive force is to be outputted to the drive wheels;
a gear mechanism configured to provide at least one gear ratio;
a continuously-variable transmission mechanism including a primary pulley, a secondary pulley, and a transfer element that is looped over the primary and secondary pulleys, such that the primary pulley includes a primary hydraulic actuator configured to apply a primary thrust, based on which the transfer element is to be clamped by the primary pulley, and such that the secondary pulley includes a secondary hydraulic actuator configured to apply a secondary thrust, based on which the transfer element is to be clamped by the secondary pulley; and
first and second engagement devices,
wherein the drive-force transmitting apparatus defines a plurality of drive-force transmitting paths that are provided in parallel with each other between the input rotary member and the output rotary member such that the drive force is to be transmitted from the input rotary member to the output rotary member through the drive-force transmitting paths,
wherein the plurality of drive-force transmitting paths include a first drive-force transmitting path that is to be established by engagement of the first engagement device, such that the drive force is to be transmitted by the gear mechanism through the first drive-force transmitting path when the first drive-force transmitting path is established by the engagement of the first engagement device,
wherein the plurality of drive-force transmitting paths includes a second drive-force transmitting path that is to be established by engagement of the second engagement device, such that the drive force is to be transmitted by the continuously-variable transmission mechanism through the second drive-force transmitting path when the second drive-force transmitting path is established by the engagement of the second engagement device,
wherein said control apparatus comprises a transmission shifting control portion configured to calculate, based on an input torque inputted to the continuously-variable transmission mechanism, a thrust ratio which is a ratio of the secondary thrust to the primary thrust and which corresponds to a target gear ratio of the continuously-variable transmission mechanism,
wherein, when the target gear ratio is a highest gear ratio of the continuously-variable transmission mechanism during running of the vehicle with the second engagement device being completely released, said transmission shifting control portion is configured to set a first value of the thrust ratio, which is used when calculating a target value of the secondary thrust based on a lower limit value of the primary thrust that is not smaller than a centrifugal thrust acting on the primary pulley, and to set a second value of the thrust ratio, which is used when calculating a target value of the primary thrust based on the target value of the secondary thrust, such that the first value of the thrust ratio is set to a first-difference increasing value that causes a first difference between the lower limit value of the primary thrust and the target value of the secondary thrust to be larger, than a value that corresponds to the highest gear ratio as the target gear ratio, and such that the second value of the thrust ratio is set to a second-difference increasing value that causes a second difference between the target value of the secondary thrust and the target value of the primary thrust to be larger, than a value that corresponds to the highest gear ratio as the target gear ratio.

2. The control apparatus according to claim 1,
wherein, when the target gear ratio is not the highest gear ratio of the continuously-variable transmission mechanism during the running of the vehicle with the second engagement device being completely released, said transmission shifting control portion is configured to set the first value of the thrust ratio to the first-difference increasing value, and to set the second value of the thrust ratio to the value that corresponds to the target gear ratio.

3. The control apparatus according to claim 2,
wherein the running of the vehicle with the second engagement device being completely released corresponds to running of the vehicle in a neutral state of the drive-force transmitting apparatus in which the first engagement device as well as the second engagement device is released, and
wherein said transmission shifting control portion is configured, during the running of the vehicle in the neutral state at a running speed that is in a relatively high range, to set the target gear ratio to a value that is dependent on the running speed, and is configured, during the running of the vehicle in the neutral state at a running speed that is in a relatively low range, to set the target gear ratio to the highest gear ratio.

4. The control apparatus according to claim 2, further comprising:
a state determining portion that is configured, during running of the vehicle, to determine whether the second engagement device is completely released or not and whether the target gear ratio is the highest gear ratio or not,
wherein, when said state determining portion determines that the second engagement device is completely released and that the target gear ratio is the highest gear ratio, said transmission shifting control portion is configured to set the first value of the thrust ratio to the first-difference increasing value, and to set the second value of the thrust ratio to the second-difference increasing value, and
wherein, when said state determining portion determines that the second engagement device is completely released and that the target gear ratio is not the highest gear ratio, said transmission shifting control portion is configured to set the first value of the thrust ratio to the first-difference increasing value, and to set the second value of the thrust ratio to the value that corresponds to the target gear ratio.

5. The control apparatus according to claim 1,
wherein the second engagement device is a wet-type frictional engagement device,
wherein said transmission shifting control portion is configured, during the running of the vehicle with the second engagement device being completely released, to handle a drag torque of the second engagement device as the input torque inputted to the continuously-variable transmission mechanism, and
wherein each of the first-difference increasing value and the second-difference increasing value includes an added value in addition to the value that corresponds to the highest gear ratio as the target gear ratio, wherein the added value is determined based on variation of the drag torque of the second engagement device.

6. The control apparatus according to claim 1,
wherein the running of the vehicle with the second engagement device being completely released corresponds to running of the vehicle with the first drive-force transmitting path being established, and
wherein said transmission shifting control portion is configured to set the target gear ratio to the highest gear ratio, during the running of the vehicle with the first drive-force transmitting path being established.

7. The control apparatus according to claim 1, wherein said transmission shifting control portion is configured to select, as the lower limit value of the primary thrust, a larger one of (i) a slip limit thrust which is minimally required to prevent slippage of the transfer element on the primary pulley and (ii) a structural limit minimum thrust which contains the centrifugal thrust acting on the primary pulley and which acts on the primary pulley.

8. The control apparatus according to claim 7,
wherein said transmission shifting control portion is configured to select, as a lower limit value of the secondary thrust, a larger one of (iii) a slip limit thrust which is minimally required to prevent slippage of the transfer element on the secondary pulley and (iv) a structural limit minimum thrust which contains a centrifugal thrust acting on the secondary pulley and which physically acts on the secondary pulley, and
wherein said transmission shifting control portion is configured to select, as the target value of the secondary thrust, a larger one of (v) the lower limit value of the secondary thrust and (vi) a value of the secondary thrust which is calculated based on the lower limit value of the primary thrust.

9. The control apparatus according to claim 7, wherein said transmission shifting control portion is configured to calculate the slip limit thrust based on a gear ratio of the continuously-variable transmission mechanism and the input torque inputted to the continuously-variable transmission mechanism.

10. The control apparatus according to claim 1, wherein said continuously-variable transmission mechanism, by which the drive force is to be transmitted through the second drive-force transmitting path, provides a continuously-variable gear ratio that is lower than at least one of the at least one gear ratio provided by the gear mechanism by which the drive force is to be transmitted through the first drive-force transmitting path.

* * * * *